United States Patent
Stone

(10) Patent No.: US 7,939,791 B1
(45) Date of Patent: May 10, 2011

(54) OPTICAL DATA PIPE

(75) Inventor: Thomas W. Stone, Hellertown, PA (US)

(73) Assignee: Wavefront Research, Inc., Bethlehem, PA (US)

(*) Notice: Subject to any disclaimer, the term of this patent is extended or adjusted under 35 U.S.C. 154(b) by 369 days.

(21) Appl. No.: 12/260,900

(22) Filed: Oct. 29, 2008

Related U.S. Application Data

(63) Continuation-in-part of application No. 11/385,449, filed on Mar. 20, 2006, now Pat. No. 7,446,298, which is a continuation-in-part of application No. 10/675,873, filed on Sep. 29, 2003, now Pat. No. 7,015,454, which is a continuation-in-part of application No. 09/425,551, filed on Oct. 22, 1999, now Pat. No. 6,635,861.

(60) Provisional application No. 60/983,477, filed on Oct. 29, 2007, provisional application No. 60/105,251, filed on Oct. 22, 1998.

(51) Int. Cl.
*G02B 6/32* (2006.01)

(52) U.S. Cl. .......................... 250/216; 250/227.11; 385/33

(58) Field of Classification Search .............. 250/208.1, 250/227.11, 216; 385/33, 89, 93, 54, 49, 385/55; 396/141, 142
See application file for complete search history.

(56) References Cited

U.S. PATENT DOCUMENTS

| 4,148,550 A | 4/1979 | MacAnally | 350/54 |
|---|---|---|---|
| 4,168,882 A | 9/1979 | Hopkins | 350/54 |
| 4,612,670 A | 9/1986 | Henderson | 455/607 |
| 5,050,954 A | 9/1991 | Gardner et al. | 386/16 |
| 5,071,216 A | 12/1991 | Sullivan | 385/34 |
| 5,093,879 A | 3/1992 | Bregman et al. | 385/93 |
| 5,245,680 A | 9/1993 | Sauter | 385/24 |
| 5,266,794 A | 11/1993 | Olbright et al. | 250/214 LS |
| 5,291,324 A | 3/1994 | Hinterlong | 359/135 |
| 5,384,874 A | 1/1995 | Hirai et al. | 385/34 |
| 6,122,042 A | 9/2000 | Wunderman et al. | 356/73 |
| 6,253,004 B1 | 6/2001 | Lee et al. | 385/31 |
| 6,870,195 B2 | 3/2005 | Lemoff et al. | 257/79 |
| 7,015,454 B2 | 3/2006 | Stone | 250/216 |

OTHER PUBLICATIONS

Kenjiro Hamanaka "Optical Bus Interconnection System Using Selfoc Lenses", Optics Letters vol. 16, No. 16; 1222-1224, Aug. 15, 1991.

Hugo Thienpont, et al. "Free Space Optical Interconnect and Processing Demonstrators With Arrays of Light-Emitting Thyristors", Proceedings of the SPIE, vol. 3002, 156-167, Conference date Feb. 13-14, 1997 [probably published several months later].

Andrew Kirk, et al. "Compact Optical Imaging System for Arrays of Optical Thyristors"Applied Optics 36, No. 14, 3070-3078, May 10, 1997.

V. Baukens, et al. "An Optical Interconnection System for Arrays of MicroEmitters and Detectors: Combining Printed Microlenses and Large Diameter GRINs", *Proceedings of the SPIE*, vol. 3490, 155-158, Conference date (Belgium) Jun. 17-20, 1998 [probably published several months later].

(Continued)

*Primary Examiner* — Tony Ko
(74) *Attorney, Agent, or Firm* — Burns & Levinson LLP; Orlando Lopez

(57) ABSTRACT

An optical interconnect system having a first optical sub-system and a second optical sub-system, each optical sub-system having a first end and a second end, and further having a preselected length, and a preselected width. Means are fixedly secured to the first end of the optical sub-system for emitting electromagnetic radiation and means are fixedly secured to said second end of said optical sub-system for receiving the emitted electromagnetic radiation.

5 Claims, 26 Drawing Sheets

OTHER PUBLICATIONS

Tomasz Maj, et al. "Interconnection of a Two-Dimensional Array of Vertical-Cavity Surface-Emitting Lasers to a Receiver Array by Means of a Fiber Image Guide", *Applied Optics* vol. 39, No. 5, 683-689, Feb. 10, 2000.

Donald M. Chiarulli, et al. "Demonstration of a Multichannel Optical Interconnection by Use of Imaging Fiber Bundles Butt Coupled to Optoelectronic Circuits", *Applied Optics* vol. 39, No. 5, 698-703, Feb. 10, 2000.

Donald M. Chiarulli, et al. "Optoelectronic Multi-Chip Modules Based on Imaging Fiber Bundle Structures", *Proceedings of the SPIE*, vol. 4089, 80-85, Conference date Jun. 18-23, 2000 [probably published several months later].

Valerie Baukens, et al. "Free Space Optical Interconnection Modules for 2-D Photonic-VLSI Circuitry Based on Microlenses and GRINs", *Proceedings of the SPIE*, vol. 4114, 169-181, Conference date Aug. 2-3, 2000 [probably published several months later].

Mohammad R. Taghizadeh, et al. "Microoptical Elements and Optoelectronic Devices for Optical Interconnect Applications", *Proceedings of the SPIE*, vol. 4455, 119-130, Conference date Jul. 29-31, 2001 [probably published several months later].

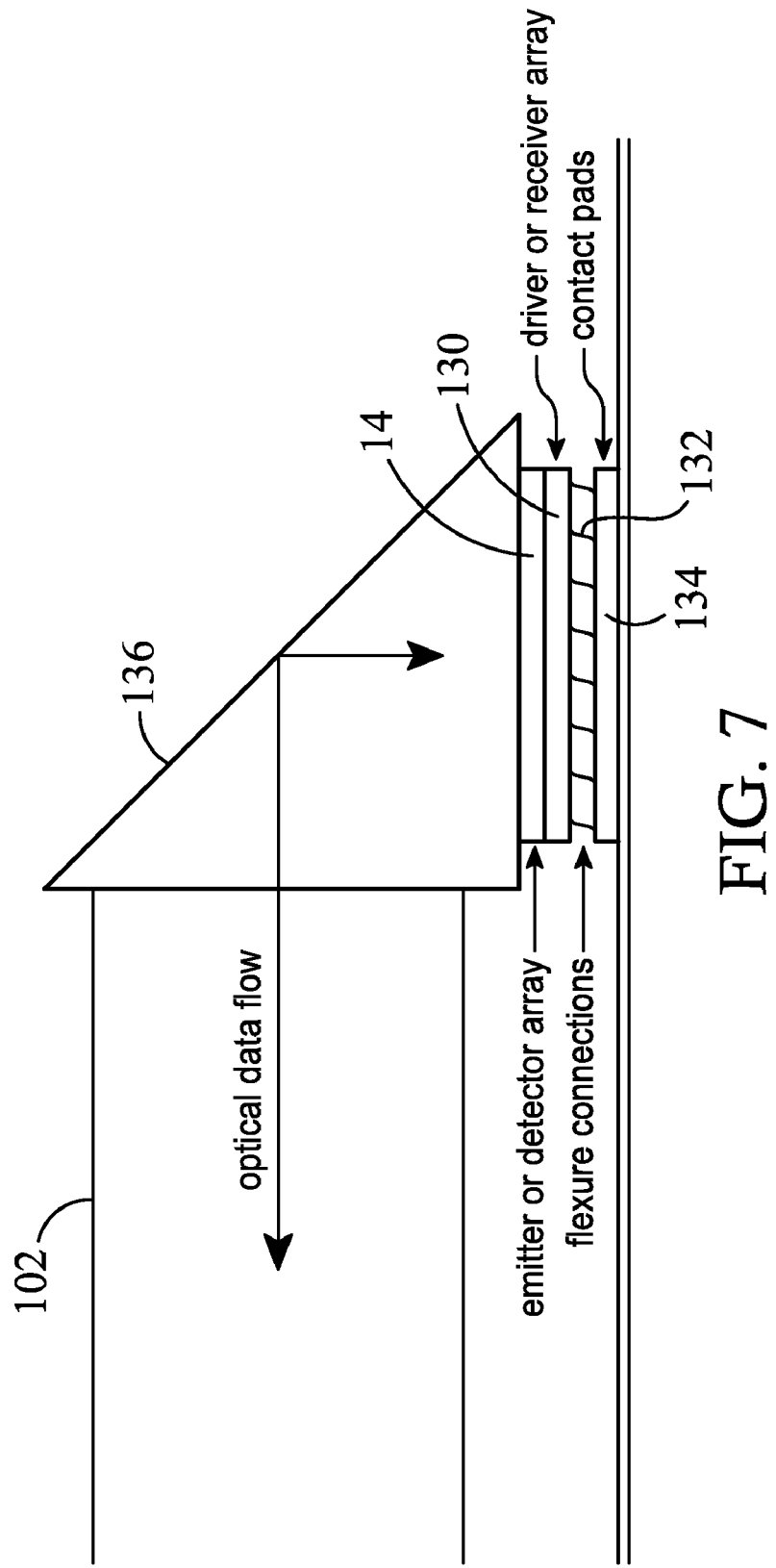

0.1 mm displacement 0.4 mm displacement 0.7 mm displacement 1.0 mm displacement all emitters are imaged with small spots on the centers of respective detectors

12 Channel Hexagonal Packing

- center alignment VCSEL
- VCSEL location
- Detector location
- one of many symmetric patterns
- optimized for inverted imaging
- only 1 mask needed

18 Channel Hexagonal Packing

- center alignment VCSEL
- VCSEL location
- Detector location
- one of many symmetric patterns
- optimized for inverted imaging
- only 1 mask needed

30 Channel Hexagonal Packing

- center alignment VCSEL
- VCSEL location
- Detector location
- one of many symmetric patterns
- optimized for inverted imaging
- only 1 mask needed

36 Channel Hexagonal Packing

- center alignment VCSEL
- VCSEL location
- Detector location
- one of many symmetric patterns
- optimized for inverted imaging
- only 1 mask needed

54 Channel Hexagonal Packing

- center alignment VCSEL
- VCSEL location
- Detector location
- one of many symmetric patterns
- optimized for inverted imaging
- only 1 mask needed

60 Channel Hexagonal Packing

- center alignment VCSEL
- VCSEL location
- Detector location
- one of many symmetric patterns
- optimized for inverted imaging
- only 1 mask needed

84 Channel Hexagonal Packing

- center alignment VCSEL
- VCSEL location
- Detector location
- one of many symmetric patterns
- optimized for inverted imaging
- only 1 mask needed

90 Channel Hexagonal Packing

- center alignment VCSEL (520)
- VCSEL location
- Detector location (510)
- one of many symmetric patterns
- optimized for inverted imaging
- only 1 mask needed

90 Channel Hexagonal Packing

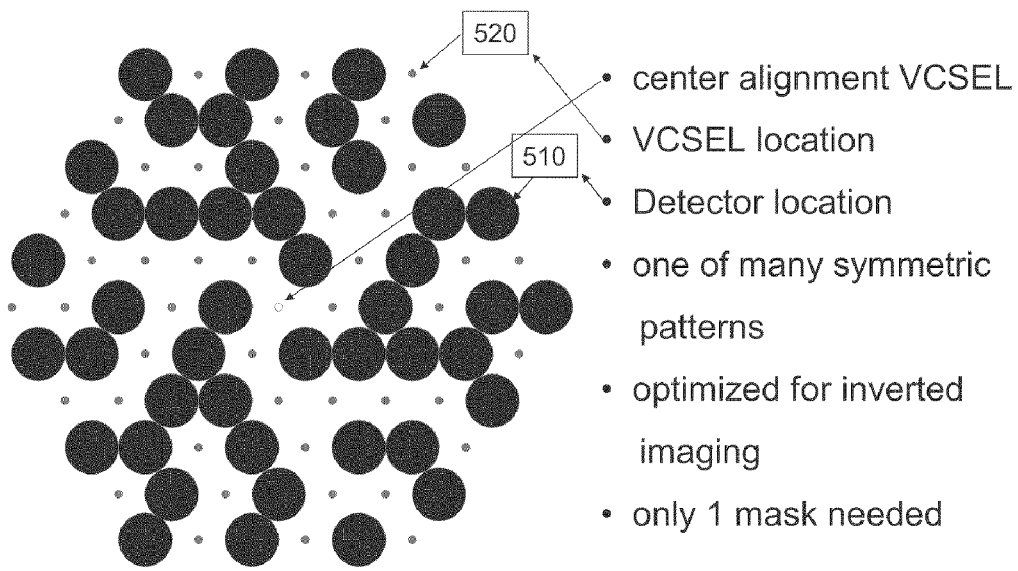

- center alignment VCSEL
- VCSEL location
- Detector location
- one of many symmetric patterns
- optimized for inverted imaging
- only 1 mask needed

Fig. 28

Alternate Coding Schemes
Single Wide Spoke Interleave

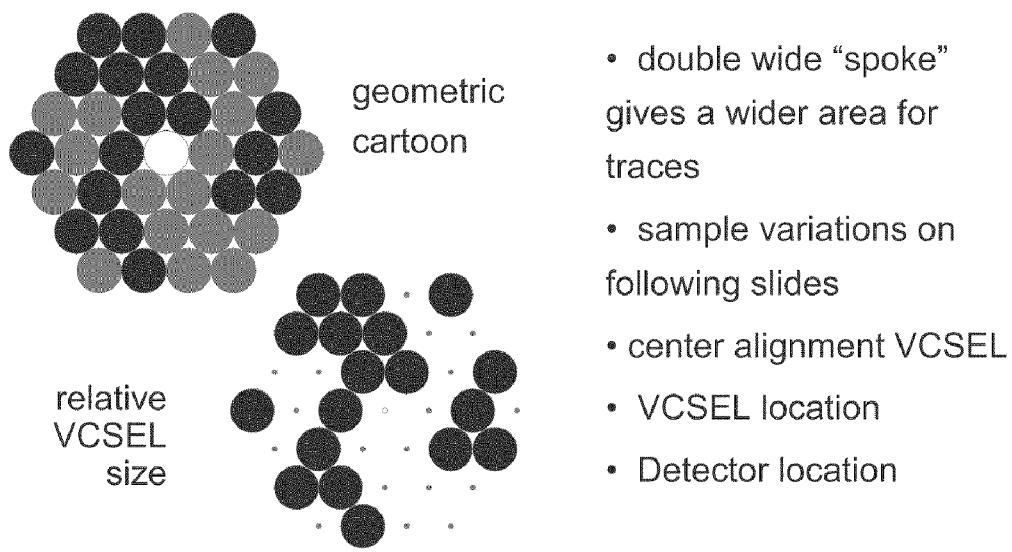

- double wide "spoke" gives a wider area for traces
- sample variations on following slides
- center alignment VCSEL
- VCSEL location
- Detector location

Fig. 29

Alternate Coding Schemes
3 Wide Spoke Interleave

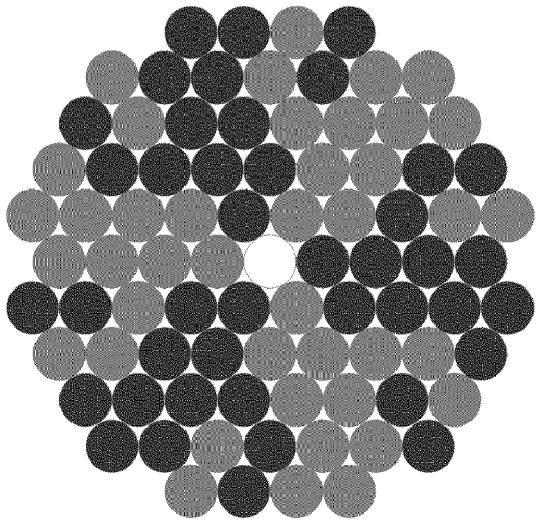

- 3 wide spokes (coarser interleave) give wider trace paths (see next slide)
- center alignment VCSEL
- VCSEL location
- Detector location

Fig. 30

Alternate Coding Schemes
3 Wide Spoke Interleave

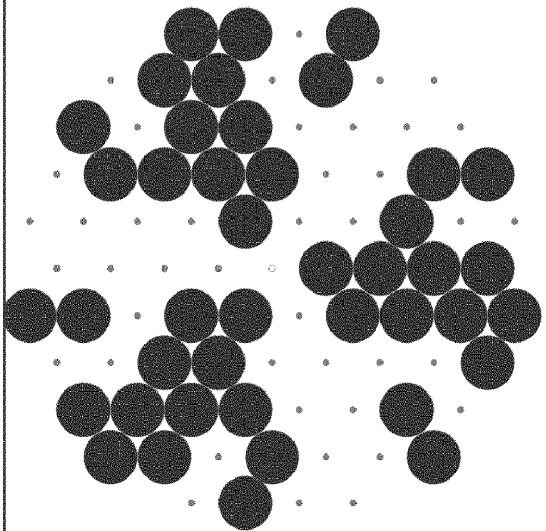

- 3 wide spokes (coarser interleave) give wider access for bundle of trace paths
- center alignment VCSEL
- VCSEL location
- Detector location

Fig. 31

Alternate Coding Schemes
Tri-Field Interleave

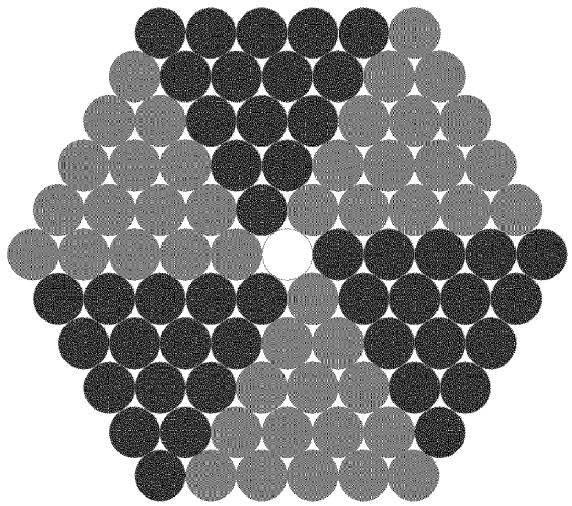

- coarser interleave yet—gives another trade-off for trace access
- center alignment VCSEL
- VCSEL location
- Detector location
- Thermal load still somewhat distributed

Fig. 32

Alternate Coding Schemes
Modified Tri-Field Interleave

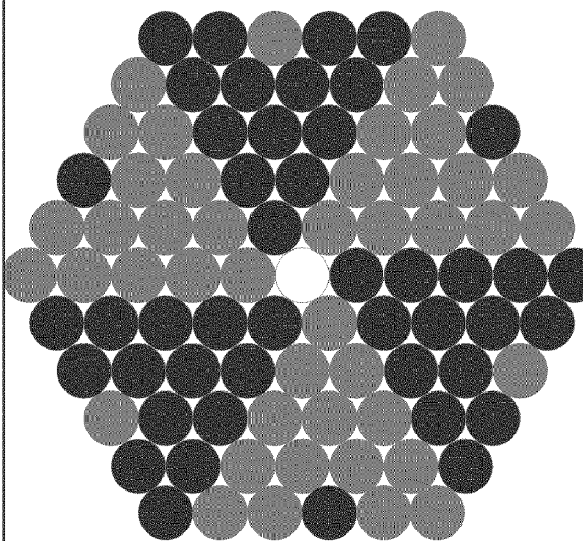

- mini-interleaves in back of large blocks aid trace access to large detector areas
- 1-element mini-interleaves shown can be expanded
- VCSEL location
- Detector location

Fig. 33

OPTICAL DATA PIPE

CROSS REFERENCE TO RELATED APPLICATIONS

This application claims priority to U.S. Provisional Application Ser. No. 60/983,477 filed Oct. 29, 2007 entitled OPTICAL DATA PIPE, which is incorporated herein by reference in its entirety.

This application is also a continuation-in-part of a co-pending U.S. application Ser. No. 11/385,449 filed Mar. 20, 2006 entitled RELAXED TOLERANCE OPTICAL INTERCONNECT SYSTEMS, which in turn is a continuation-in-part of U.S. patent application Ser. No. 10/675,873, now U.S. Pat. No. 7,015,454, entitled RELAXED TOLERANCE OPTICAL INTERCONNECT SYSTEMS, filed on Sep. 29, 2003, which in turn is a continuation-in-part of U.S. patent application Ser. No. 09/425,551, now U.S. Pat. No. 6,635,861, entitled RELAXED TOLERANCE OPTICAL INTERCONNECT SYSTEMS, filed on Oct. 22, 1999, which in turn claims priority of U.S. Provisional Application No. 60/105,251 entitled OPTICAL DATA PIPE, filed on Oct. 22, 1998, all of which are incorporated herein by reference in their entirety.

STATEMENT OF FEDERALLY SPONSORED RESEARCH OR DEVELOPMENT

This invention was made with U.S. Government support from the Missile Defense Agency and U.S. Air Force under contract FA8750-04-C-0250. The Government has certain rights in the invention.

BACKGROUND

The present teachings relate generally to interconnection systems, and, more particularly, to alignment tolerant dense optical interconnect systems which incorporate the use of rod lenses or infinite conjugate imagers. The present invention includes array geometries for devices such as emitters and detectors that provide for compactness, crosstalk, wiring, and other advantages when used in a parallel optical interconnect system such as the optical data pipe devices described herein.

With the advent of substantial new performance levels in high bandwidth digital and analog electro-optic systems, there exists a greater need to provide dense, alignment tolerant interconnection capability. This is especially true in digital computing systems; in analog systems such as phased array radar; and in high bandwidth optical carriers in communication systems. However, it should be realized that these are just several of numerous systems which benefit from application of high-bandwidth electro-optic interconnection.

In many current and future systems light beams are modulated in a digital and/or analog fashion and used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels.

Conventional electrical interconnection over wires or traces is reaching severe performance limits due to density, power, crosstalk, time delay, and complexity. For example, chip scaling continues to provide for a doubling of transistors on a chip every 18 months. A 2 cm×2 cm chip currently requires 2 km of wires or traces for interconnection with 6 layers of metal and the complexity exponentiates with the number of metal layers. With designs using 0.18 micron wires, 60% of the delay is from the interconnects themselves. In shrinking from 0.5 micron wires to 0.18 micron wires on chip, the RC time constant increases by a factor of 10. Using optical interconnection, the power dissipation does not scale with the length of interconnection, and optical interconnects are superior for short signal rise times. Similar advantages of optical interconnection over electrical interconnection pertain to longer range interconnection, e.g., from chip-to-chip, intra-board, inter-board, and computer-to-peripheral.

Other optical interconnect approaches suffer from critical alignment tolerances; restrictive focusing, component separation and vibration tolerance requirements; insertion loss which limits speed and power efficiency; bulky and large-footprint optical systems; limited density and scalability; lack of physical flexibility and compliance of the interconnect, and the need to provide an excessively protective environment in order to maintain optical alignment over time.

SUMMARY

The present teachings overcome problems associated with size, power, crosstalk, and speed associated with conventional electrical interconnects, and overcomes problems with alignment tolerance in conventional optical interconnection. Further, the present invention includes array geometries for devices such as emitters and detectors that provide for compactness, crosstalk, wiring, and other advantages when used in a parallel optical interconnect system such as the optical data pipe devices described herein.

In one embodiment of the optical interconnect system or optical data pipe approach of the present teachings, although not limited thereto, mating emitter and detector arrays (such as the emitter and detector arrays described below) are pre-aligned and fixed on or near the ends of a gradient index rod imager, and this flexible pre-aligned structure is then mounted to the host. Using this technology, which includes the various embodiments of these teachings, hundreds or thousands of high bandwidth channels can be interconnected for short distances (intra-die, between neighboring chips or MCMs) or over relatively long distances (full board wrap-around, board-to-board, computer to peripheral, computer to computer, etc.). The optical interconnect system of these teachings provides a nearly lossless one-to-one optical interconnection from a set of input channels to a set of output channels, and supports extreme density, low power, and low crosstalk for high bandwidth signals.

One of many advantages of the system of these teachings is that it can be pre-aligned and fixed during manufacture (e.g., using automated alignment and cementing procedures) to produce optical interconnects that have greatly relaxed alignment tolerances and are thus readily usable in the field by non-optical personnel. The interconnection systems of the present teachings are thus tolerant of handling, bending and displacements among interconnected components without losing their function of interconnecting many closely packed (dense) optical channels. Other advantages of these teachings relate to the fact that it is tolerant of misalignments, vibrations, etc.

For a better understanding of the present teachings, together with other and further objects, reference is made to the following description taken in conjunction with the accompanying drawings, and its scope will be pointed out in the appended claims.

BRIEF DESCRIPTION OF THE DRAWINGS

FIG. 7 is a schematic representation of a prism used with one embodiment of the optical interconnect system of these teachings;

FIGS. 20-37 show positions for emitters and detectors in a bi-directional optoelectronic die layout;

DETAILED DESCRIPTION

If an optical interconnect approach is to have a significant impact in practice, it must possess a variety of desirable characteristics including in particular a tolerance for misalignments and alignment variations among the interconnected components. These areas are highlighted and described briefly hereafter:

Alignment Tolerance, with the ability to function in a practical computer environment which is subject to vibrations, thermal variations, misalignments between interconnected components and devices, etc.

High channel density: allowing for hundreds of parallel channels to be interconnected with a small footprint.

High channel bandwidth: allowing for data rates in the megahertz and gigahertz regimes.

Low insertion loss: allowing for high speeds with low power consumption.

Uniform delay for all data channels, therefore introducing little or no relative skew in the switched signals.

Miniaturized opto-electronics interconnecting many parallel optical channels in a compact package. The ability to densely pack channels in a volume (e.g., a slender flexible rod) rather than along planar substrate or circuit board surface will be a distinct advantage.

Low crosstalk between neighboring optical data channels.

Monolithic packaging for ruggedness and low insertion loss.

Scalability to large numbers of data channels.

The terms "detectors" and "receivers" are used interchangeably hereinbelow. Also, the terms "tiled" and "interleaved" are used interchangeably hereinbelow. Additionally, the term "die" also means "mask" or "stencil".

Figure 1:
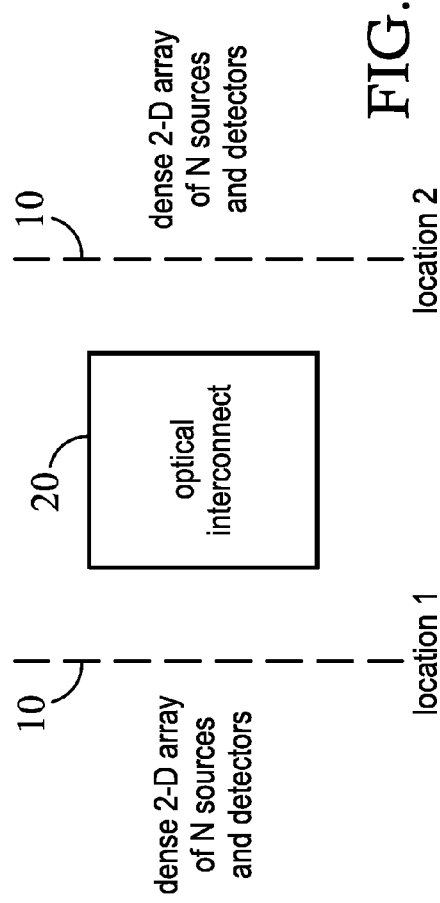
FIG. 1 is a schematic representation of the problem addressed by the optical interconnect systems of the present teachings.

The general optical interconnection problem addressed by the present teachings is shown in FIG. 1. Here there are two planes A1 and A2 of densely packed emitters and detectors that are interconnected by an optical interconnect 20. For clarity, not shown are the drivers for the emitters and amplifiers for the detectors. In general, each of the planes contain both emitters and detectors to enable bi-directional communication. The emitters are sources of electromagnetic radiation (in this application equivalently referred to as optical radiation, optical signals, or light). The electromagnetic radiation can be modulated to carry information that originated, for example, on electrical signals, and the electromagnetic radiation has a higher frequency than that of the information it carries. For example, the emitters can be sources of electromagnetic radiation in the infrared, visible, or ultraviolet spectral bands. This emitted electromagnetic radiation can then be modulated with information including frequencies and data rates ranging from DC to many gigahertz and higher. The detectors then receive the electromagnetic radiation and extract the information usually in the form of electrical signals. The terms electromagnetic radiation, optical signals, and light are used to refer to the high frequency electromagnetic radiation carrier described above and are distinguished from the information carried by the optical interconnect system and the input and output electrical signals, which can also be electromagnetic in nature. The optical interconnect systems described below of the present teachings couple electromagnetic radiation from corresponding optical channels or among mating emitters and detectors with the features described above.

Figure 2:
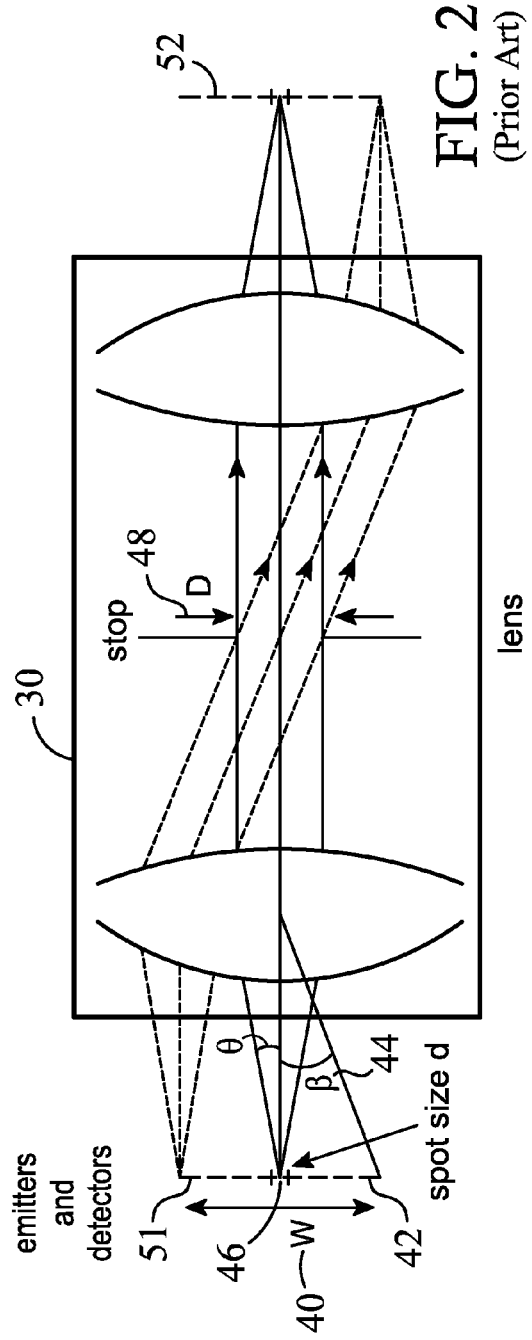
FIGS. 2 and 3 represent prior art approaches.

One of the two primary limiting approaches to this optical interconnect problem is the macro-optical approach. In macro-optics, a single optical system is used to simultaneously image the entire array of optical channels from emitter array to detector array. A typical prior art macro-optical imaging approach is illustrated in FIG. 2. Here a single lens system 30 is used to simultaneously image many optical channels 42 between planes 51 and 52. The optical channels are arrayed in the optical field extent 40 of width W. Key parameters for such a system are the field extent W, field angle 44 of width $\beta$, spot size or resolution 46 or d, and stop 48 of diameter D.

In the classic or prior art macro-optic approach, the tradeoffs are very well defined. The lens required to maintain small spot sizes d over a large device field W grows rapidly in complexity. For example, the spot size d of even a perfect lens is limited by diffractive spreading of the light through the finite aperture of the lens. If there were no aberrations in the lens, the spot size can be shrunk as far as to the order of a wavelength of the imaged light by increasing the stop diameter D, or equivalently by increasing the numerical aperture of the system (which is proportional to the sine of $\theta$).

However, in practice there are always aberrations present. A major goal of the design of this prior art type of interconnect lens system is to reduce the magnitude of sum of the aberrations present to the order or magnitude of the desired spot size. Rather than attempting to eliminate each of the aberrations, they are balanced so that they form a net aberration magnitude that is acceptable. In order to accomplish this difficult task, many degrees of freedom are introduced including split and multiple elements, refractive surface curvatures, spacings, glass choice, apertures, etc.

Perhaps the largest limitation in the macro-optic approach is the lack of scalability of a given lens system. If there is a diffraction limited lens system that performs acceptably with spot size d over a field of extent W, a natural approach to increasing the covered field (and thus the number of optical channels that can be interconnected) is to scale up the size of the lens system by a factor s. In this process, linear dimensions are scaled and angles are preserved. Accordingly, the larger field with the same spot size should, in principle, provide for more independent optical channels. After scaling the lens, the diffraction limited spot size remains the same. However when scaling is performed, the forms of the aberrations remain the same but their magnitude is scaled by s. As a result, the balance of aberrations that was acceptable prior to scaling is no longer adequate. The net aberration magnitudes (which were in balance with the spot size prior to scaling) can scale larger than the desired spot size. As a result of the larger actual spot sizes, the scaled up field extent W can in practice eliminate any net increase of optical channels that are interconnected. The only alternative is to redesign the scaled lens in hope of reducing the magnitude of aberrations of the larger lens to the same magnitude which the lens had prior to scaling.

A further drawback for the macro-optic approach remains. If a single lens is used to image, using finite conjugates, arrays of emitters and detectors, there is still the unreasonable alignment sensitivity between the two planes. Relative motions between either of the planes, on the order of the detector sizes, will be catastrophic.

Figure 3:
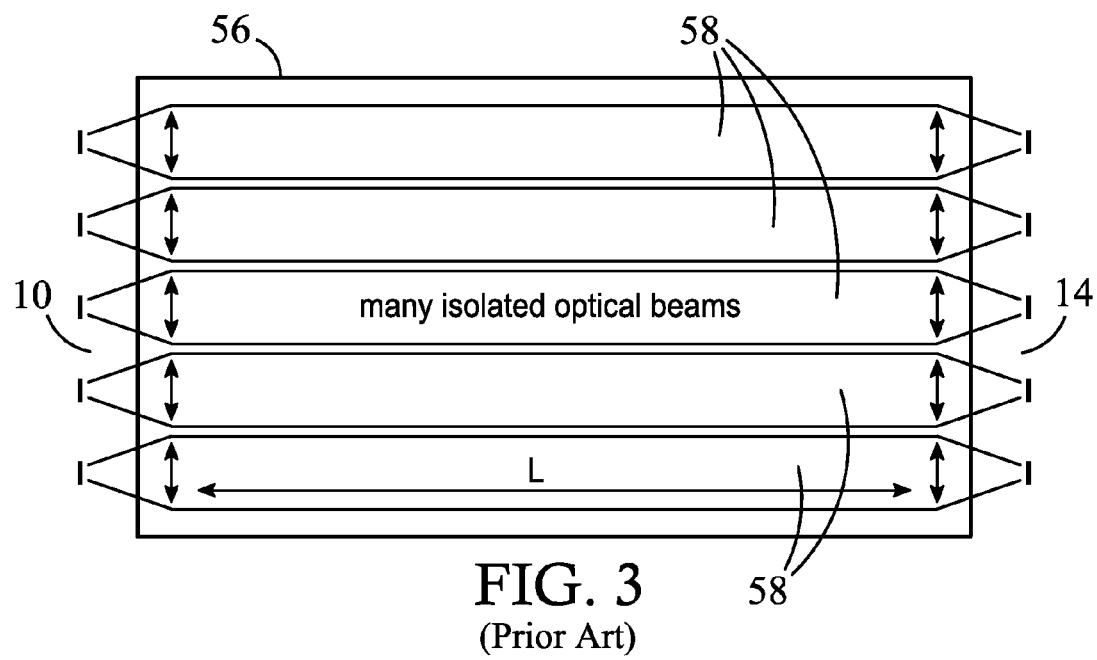

The other major limiting approach to the optical interconnect problem described above is the micro-optic approach. With micro-optics, many much-simpler parallel optical systems are used to image the many optical channels one at a time. These micro-optic elements are therefore arrayed in the parallel optical channels. This prior art approach is illustrated in FIG. 3, where two arrays of devices A1 and A2 are imaged with an array of simple refractive or diffractive micro lenses 56. The channels are interconnected by many isolated optical beams 58.

In this micro-optic limit, there is an imaging lens for each device. Since the device can be placed on the axis of symmetry of the simple lens elements, the performance of the lens does not need to be maintained over an extended field as was the case with the macro-optic limit. As a result, the complexity and size of the lens can be greatly scaled down. Further, another distinct advantage here is that there is a trivial scaling requirement, which now simply amounts to extending the size of the device array and corresponding size of the microlens array. This is in sharp contrast to the complex scaling problems in the macro-optic approach described previously.

There remains a significant problem, however, with the micro-optic approach to high density optical interconnection. This is due to the presence of diffractive crosstalk among neighboring optical channels. Diffractive spreading from the aperture of each of the microlenses causes light to couple into neighboring channels, resulting in crosstalk. The larger the aperture of the microlenses, the smaller is this diffraction spreading effect. However, since the neighboring lenses cannot overlap, reducing diffractive crosstalk forms a major performance tradeoff with density of the interconnection.

From a geometrical analysis augmented by results from diffraction theory, it can be shown that the optical signals in the parallel channels can propagate a critical distance $L_c$ before the beam, augmented by diffraction, will cross over into the neighboring channel—i.e., until the crosstalk becomes significant. This critical distance is given by:

$$L_c = D^2/2\lambda, \qquad (1)$$

where D is the microlens aperture and $\lambda$ is the communication wavelength.

Thus for a device spacing and microlens aperture of 100 microns, the beams can only propagate for a few millimeters before crosstalk is significant. Increasing the aperture of the microlenses results in a squared effect on the crosstalk free propagation distance, but if a large relay distance is required for the signals, the sought after high density of the optical channels must be sacrificed in order to prevent diffractive crosstalk.

Figure 4:
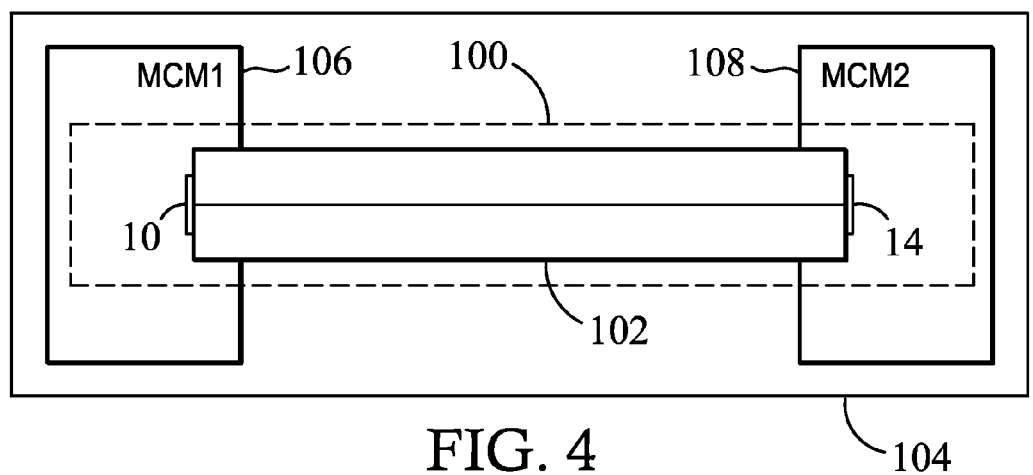
FIG. 4 is a schematic representation of a fixed point-to-point monolithic optical interconnect system of the present teachings.

A first preferred embodiment of the relaxed tolerance optical interconnect system of the present teachings is the fixed point-to-point monolithic optical data pipe 100 illustrated in FIG. 4, where the term optical data pipe may also be referred to herein on occasion as optical interconnect 100. Here mating interconnection planes 10 and 14 are affixed preferably by an adhesive "cement" on the ends of a gradient index (GRIN) rod imager 102, and this flexible pre-aligned structure is then mounted to the components 106 and 108 of host 104 which provides dense interconnection. The interconnection planes 10 and 14 can contain emitters, detectors, or general optical channel ports such as arrays of free-space channels or guided wave (fiber) channels, or the like. This device is capable of very high channel densities, on the order of hundreds along a cross section of only a few millimeters. Using demonstrated Vertical Cavity Surface Emitting Microlaser (VCSEL) technology, each of these channels is capable of multi-gigahertz data rates at these high spatial densities. The small insertion loss allows high data rates and low power consumption. Negligible temporal skews are generated once the optical signals are generated in the optical data pipe 100, independent of the length of the link (millimeters to feet). A distinct advantage of the monolithic construction of the optical data pipe 100 is that it is very tolerant of flexure and relative misalignments between the components being interconnected.

In one embodiment of the optical interconnect system of the present teachings, also referred to as an optical data pipe 100, a gradient index (GRIN0 rod 102 is used as a data pipe for conducting hundreds of high bandwidth optical interconnections with little crosstalk. This high density optical data pipe 100 is formed by pre-aligning and permanently affixing mated emitter and detector arrays to or near the ends of a gradient index (GRIN) rod lens imager. This rod lens images the optical channels, emitters, or detectors onto each other as conjugate image planes. The magnification can be unity or non-unity in this imaging operation. The monolithic end-to-end connection of device planes 10 and 14 and rod lens 102 forms a flexible pre-aligned structure capable of interconnecting hundreds of high bandwidth optical channels in a digital computer environment.

The gradient index rod lens 102 forms the backbone of the relaxed tolerance optical interconnect system 100 of the present teachings. The rod lens 102 can be made with a broad range of diameters and lengths by controlling the gradient of the refractive index profile. The rod lens 102 is typically 0.2 mm-5.0 mm in diameter and can image with high resolution from rod face-to-rod face over distances from millimeters to many meters.

Figure 5:
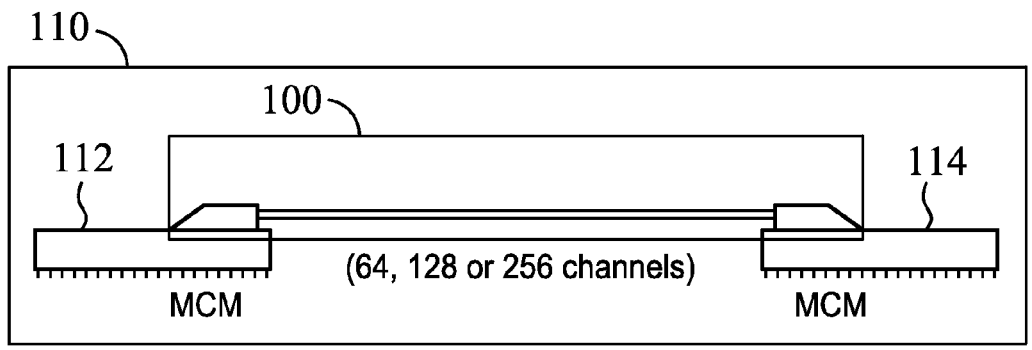
FIG. 5 is a schematic representation of an embodiment of an interconnection of The optical interconnect system of this teachings.

In the optical data pipe 100, the interconnected planes 10 and 14 of optical channels are rigidly fixed as an integral part of the system. This link can then be mounted to interconnect multichip modules (MCMs), dies, or boards. This type of interconnection is illustrated in FIG. 5 where MCMs 112 and 114 are interconnected with optical data pipe 100. Similarly, drivers amplifiers, and supporting electronics can be grouped in place of MCMs 112 and 114 to form a plug-replaceable optical interconnect component 110 which is flexible and alignment tolerant. This flexible device offers relaxed alignment sensitivities with very high density of interconnected channels. For example, hundreds of multi-GHz channels can be interconnected through a cylinder that is ~2 mm in diameter and which can be several millimeters to meters long. The optical data pipe can be used for short-range or long-range (e.g., board wrap-around) high density communication that is established with transceiver modules 110 that include drivers, amplifiers, and other support for the pre-aligned emitter and detector arrays and rod lens.

The data pipe or optical interconnect system of the present teachings has the benefit of relaxed alignment sensitivity since the critical elements are rigidly pre-aligned on the gradient index rod lens. Further, since the rod is flex-tolerant as shown below, misalignments and vibrations can be tolerated without interrupting the optical data communication. Additional benefits include a high channel density of high-bandwidth optical channels with negligible crosstalk or optically added signal skews, and sparse use of board real estate. This device can be used for dense short-range and long-range interconnection. An important part of the present teachings is to pre-align and rigidly couple the emitters and detectors to ends only of the flexible gradient index (GRIN) rod lens thus forming a robust data pipe which is tolerant of stresses, vibrations, and misalignments typical in high performance computer and application environments.

The optical data pipe 100, while only typically on the order of several mm's in diameter, can relay hundreds of channels over distances spanning millimeters (for MCM-to-MCM communication); several tens of centimeters (for processor array wrap-around across a board, etc.); or even meters for applications such as linking supercomputers to external memory. This high density interconnection is accomplished with low loss, and clean imaging, and extreme densities.

The channels in the optical data pipe 100 can be packed with extreme density. For example, the optical channel pitch for emitters such as vertical cavity surface emitting microlasers (VCSELs) can be 125 microns or closer and still permit simultaneous operation due to recent VCSEL technology innovations. If a 32×32 VCSEL array has a 62.5 micron pitch, 1024 optical channels could fit in a 2 mm square. The key to these higher densities lies in reducing the heat and thermal crosstalk between neighboring channels. It is expected that simultaneous CW operation of arrays such as these with smaller pitches, e.g., 125 or 62.5 micron pitches are possible.

Higher densities may also be achieved through arranging the VCSEL devices on a hexagonally packed grid. The VCSEL array may be hexagonally packed in a circular array, and for bi-directional links, emitters and detectors may be tiled in some fashion on a single die.

Figure 6A:
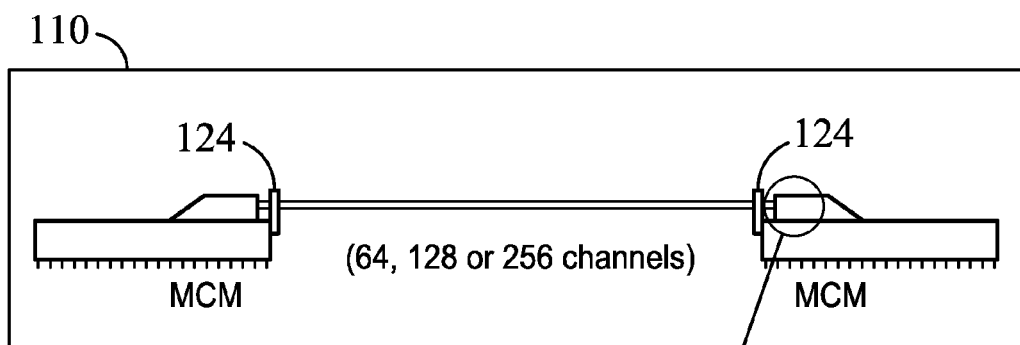
FIGS. 6A and 6B schematically and pictorially, respectively represent a dense hexagonally packed emitter array utilized with the present teachings, with FIG. 6B being an exploded view thereof.
Figure 6B:
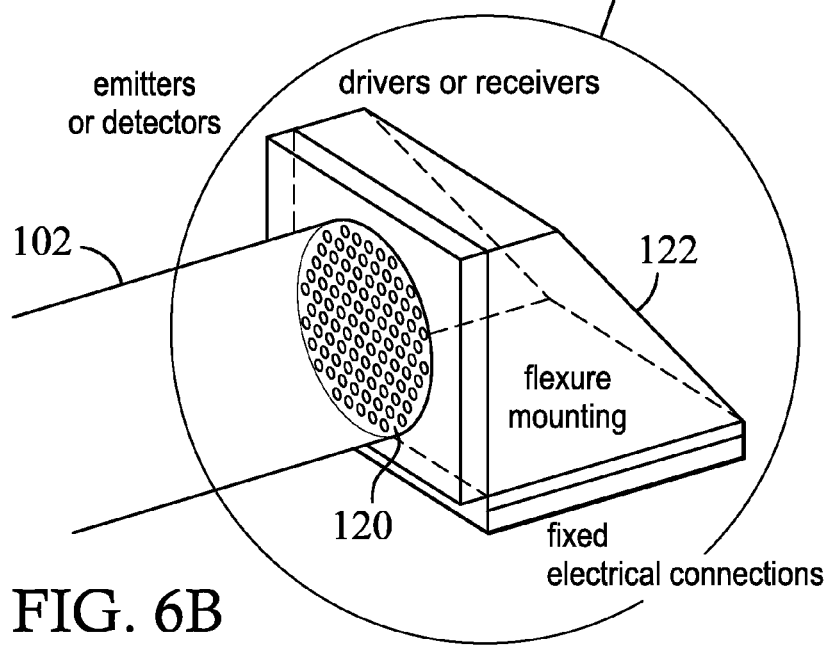

FIGS. 6A and 6E illustrate a dense circular hexagonally packed emitter array 120. Relaxed alignment tolerances are provided by either the natural flexibility of the slender GRIN rod lens, or flexure mountings 122 can be used to absorb misalignments between the MCMs and the pre-aligned optical components.

The fieldability and ruggedness of the optical data pipe or optical interconnect system of the present teachings can be increased in several ways. For example, the ends of the GRIN rod lens may be rigidly affixed to the hosting MCMs. In this way, the natural flexibility of the data pipe can be used to absorb misalignments and vibrations among the circuit component ends. Accordingly the strain relief clamps 124 shown in FIG. 6A can be used to fix the GRIN rod lens rigidly to the transceiver modules, and since the GRIN rod lens is flexible, it can be used to absorb flexures and misalignments.

For many applications it is natural for the optical data pipe or optical interconnect system of these teachings to lie parallel to a circuit board, and in those cases it may be more practical to have the emitter and detector arrays mounted parallel to the board rather than at an angle to it. This need can be accommodated by modifying the gradient profile of the rod lens so that conjugate planes are imaged off the end face of the rod. This permits the device arrays to be mounted on prisms or sub-assemblies as shown in FIG. 7. Here the end of the rod lens 102 is affixed to a prism/mirror 136 which directs the light toward the board. While the optical channel plane 14 is remote from the end of the rod 102 it is still fixed with respect to the rod end such as by cementing it to the prism/mirror 136. An array of drivers and receivers 130 can also be attached with interleaving flexible electrical connectors 132 optionally used to provide further alignment tolerance to component contact pads 134.

In FIG. 7, a prism 136 is used to fold the optical path at a right angle so the die can be more easily electrically connected to the host. Flexure connections 132 such as "s"

springs can optionally be used to allow for small displacements as may be generated thermally.

Figures 8A, 8B, 8C, 8D:
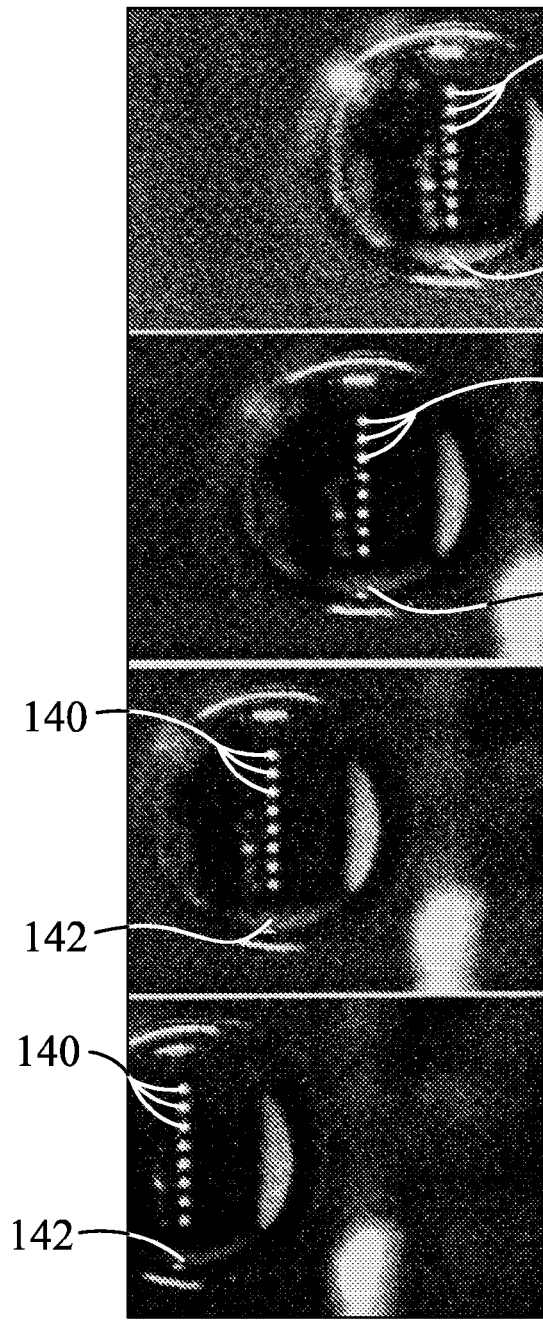
FIGS. 8A-8D are photographs of alignment of channels during bending of The optical interconnect system of the present teachings.

Making use of the natural flexibility of the GRIN rod lens 102 is an important feature of these teachings. The GRIN rod lens 102 of the optical interconnect system 100 of these teachings can be bent and the alignment of the channels is maintained as illustrated in the photograph sequence of FIG. 8. Optical channels 140 remain fixed with respect to the rod lens end 142 as the long rod lens is bent with end-displacements of 0.1, 0.4, 0.7, and 1.0 mm in photographs 8A, 8B, 8C, and 8D, respectively. As the GRIN rod lens is deflected while carrying the image of an array of 8 VCSELs, the output face of the lens was photographed with a CCD camera and the output image remains essentially fixed in position on the output face. Thus when a detector array is pre-aligned and affixed on the face, deflections and misalignments of this order of magnitude can be tolerated without appreciable deleterious effects on the dense interconnection of the optical channels.

Quantitative data was also obtained where it was shown that for a deflection of 6 mm, the optical channels are deflected by less than 10 microns, if at all. Insensitivity of optical channel location with vibrations and misalignments are accommodated by the present optical interconnect system is a major feature of these teachings.

Figure 9:
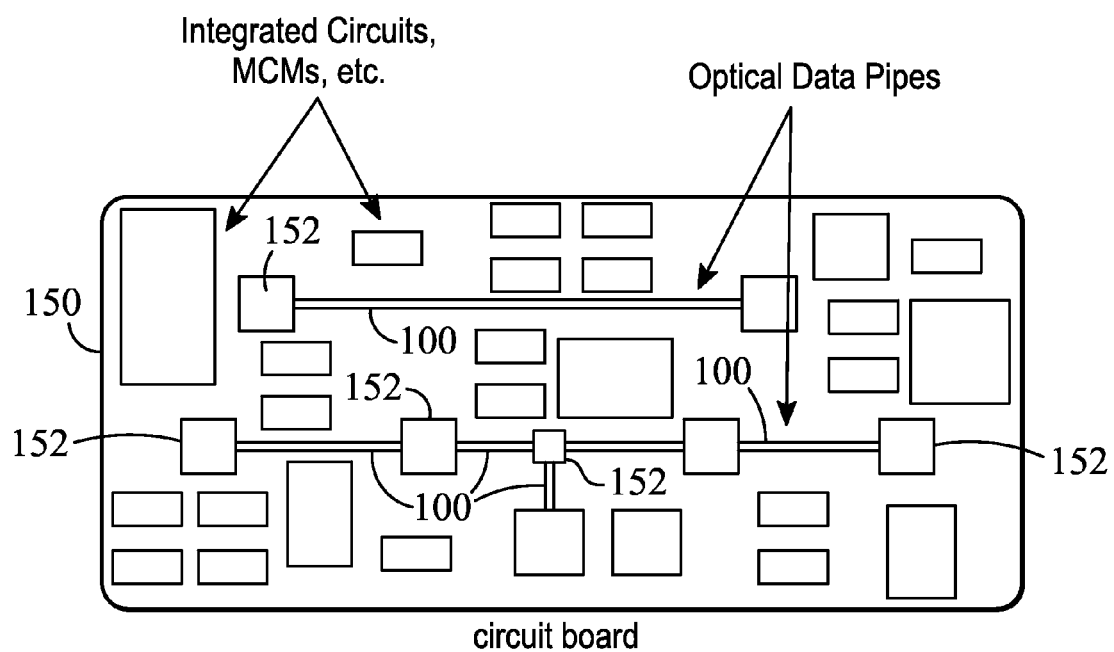
FIG. 9 is a schematic representation of a circuit board application of the optical interconnect system of these teachings.

A typical circuit board application for the optical interconnect system of these teachings is illustrated schematically in FIG. 9. Here remote MCMs or devices 152 are interconnected with hundreds of high bandwidth, low crosstalk, low skew channels using optical data pipes 100 on board 150, and with very efficient use of board real-estate. In each case, the optical data pipe 100 is flexible and connected rigidly at its ends only to the interconnected components. Other board placement variations which can be accomplished by the optical interconnect system of these teachings similarly include, for example, board-to-board side connection, board-to-board edge connection, and system-to-system interconnection.

Figure 10:
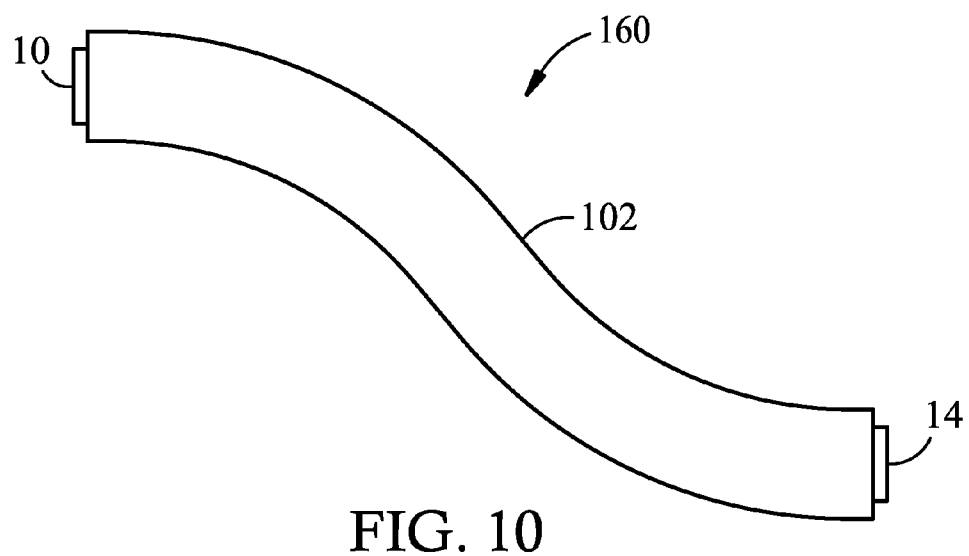
FIG. 10 is a schematic representation of an embodiment of these teachings illustrating a curved optical interconnect (optical data pipe) used with these teachings.

A further embodiment 160 of these teachings involves the use of a GRIN rod lens 102 which is curved and still interconnect optical channel planes 10 and 14 as shown in FIG. 10. This curving rod may be obtained by heating a straight rod lens.

Figure 11:
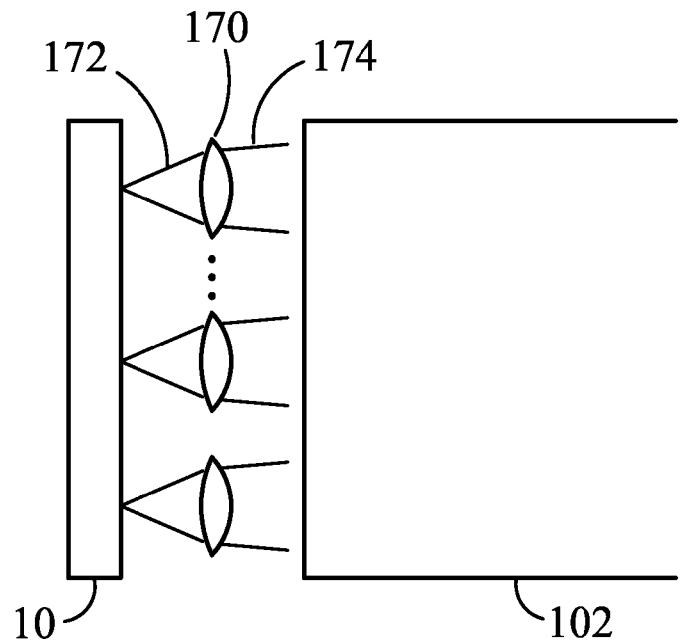
FIG. 11 is a schematic representation of micro-optic lens arrays used with the optical interconnect systems of these teachings.

In FIG. 11 micro-optic lens arrays are shown to reduce the divergence angle (numerical aperture) of the light beams (channels) 172 emanating from optical channel plane 10. The smaller numerical apertures of the light beams 174 incident on the rod lens 102 can improve the transmission through the rod lens and lower the required numerical aperture of the rod lens used in the optical data pipe 100. This same technique is useful for an optical interconnect system of these teachings where the planes 10 and 14 are spaced apart from the ends of the rod lens. In such as case, the light beams 172 can be nearly collimated and directed toward the rod lens 102 face thereby reducing or eliminating light loss.

Figure 12:
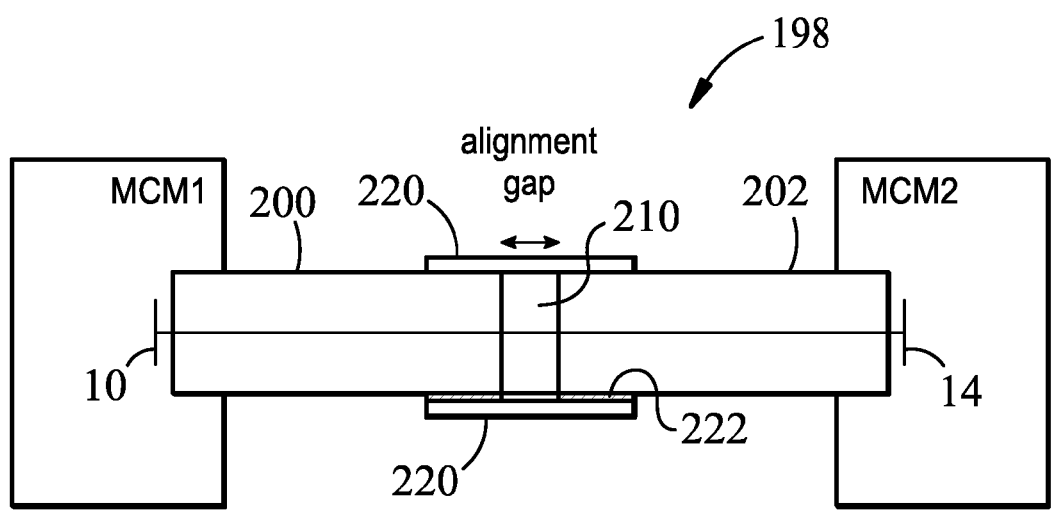
FIG. 12 is a schematic representation of another embodiment of the optical interconnect system of these teachings.

Another embodiment of the relaxed tolerance interconnect system 198 of the present teachings is shown in FIG. 12, which relaxes alignment tolerances by mounting symmetric infinite conjugate rod lens imagers 200 and 202 (which may be in the form of GRIN rod lenses) in pairs in front of mating optical channel planes 10 and 14. This inherently relaxes alignment sensitivities to gap width and lateral translation because beams from each channel are wide, collimated plane waves in the gap region 210. Lateral shifts of the order of channel spacing in plane 10 are usually devastating in micro-optic interconnection schemes, but result in very little loss with this embodiment of the present teachings. Similarly, longitudinal motions that increase or decrease the gap region 210 produce only a slow walk-off of channel throughput and do not alter the tightly focused conjugate channel imaging in planes 10 and 14. An optional alignment sleeve or collar 220 can be used to make the interconnect easily disconnectable and reconnectable. A keyed groove 222 in collar 220 can be used to prevent rotational mis-alignment.

The relaxed tolerance approach of these teachings as shown in FIG. 12 results in wide insensitivity to lateral and longitudinal misalignments (parallel and perpendicular to the direction of the alignment gap), which is critical for practical application. However there is still pronounced sensitivity to tilts between the two interconnection planes. Spacers may be used (see below) in some configurations to reduce the presence of tilts. Alternatively if the collar 220 is used but kept much shorter than the rod lens lengths, the same type of flexure benefit obtained in the optical data pipes described in earlier embodiments is retained since the rods can flex. Such flexure here too is with no ill effects since the collar maintains the alignment at the infinite conjugate interface region where gap width tolerances are also relaxed. This "cutting" of the optical data pipe or optical interconnect system 198 at infinite conjugate locations of the internal imaging adds an additional longitudinal alignment compliance to the system described earlier.

Figure 13:
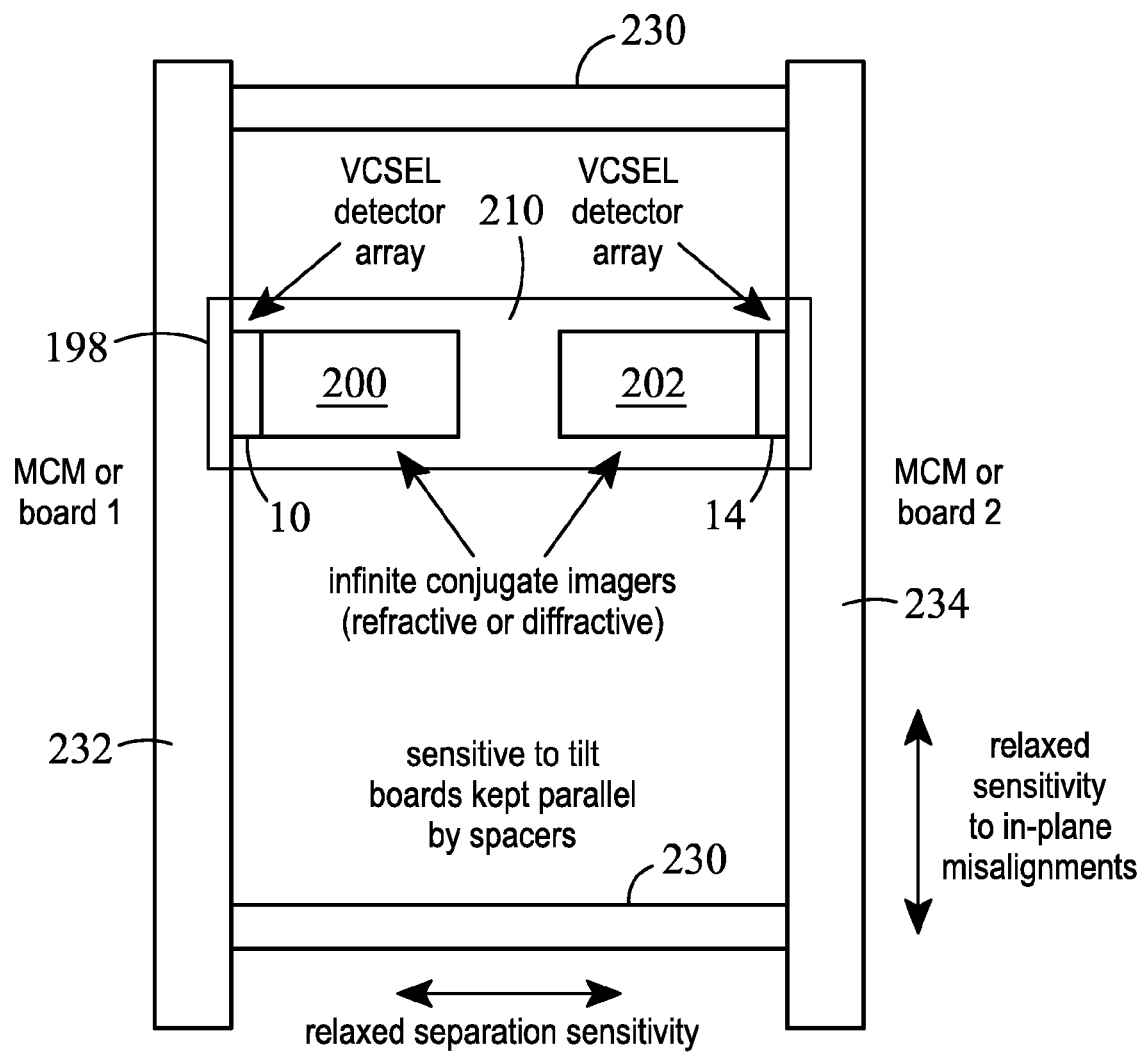
FIG. 13 is a schematic representation of a relaxed tolerance interconnect system of these teachings linking channels between boards or MCM's.

The relaxed tolerance interconnect 198 of FIG. 12 can be used to provide parallel optical interconnection from board to board and similar scenarios. For example, FIG. 13 illustrates the relaxed tolerance interconnect system 198 linking channels between boards or MCMs 232 and 234. If no collar 220 is used, spacers 230 may be used to keep the boards parallel and thus angularly aligned.

Figure 14:
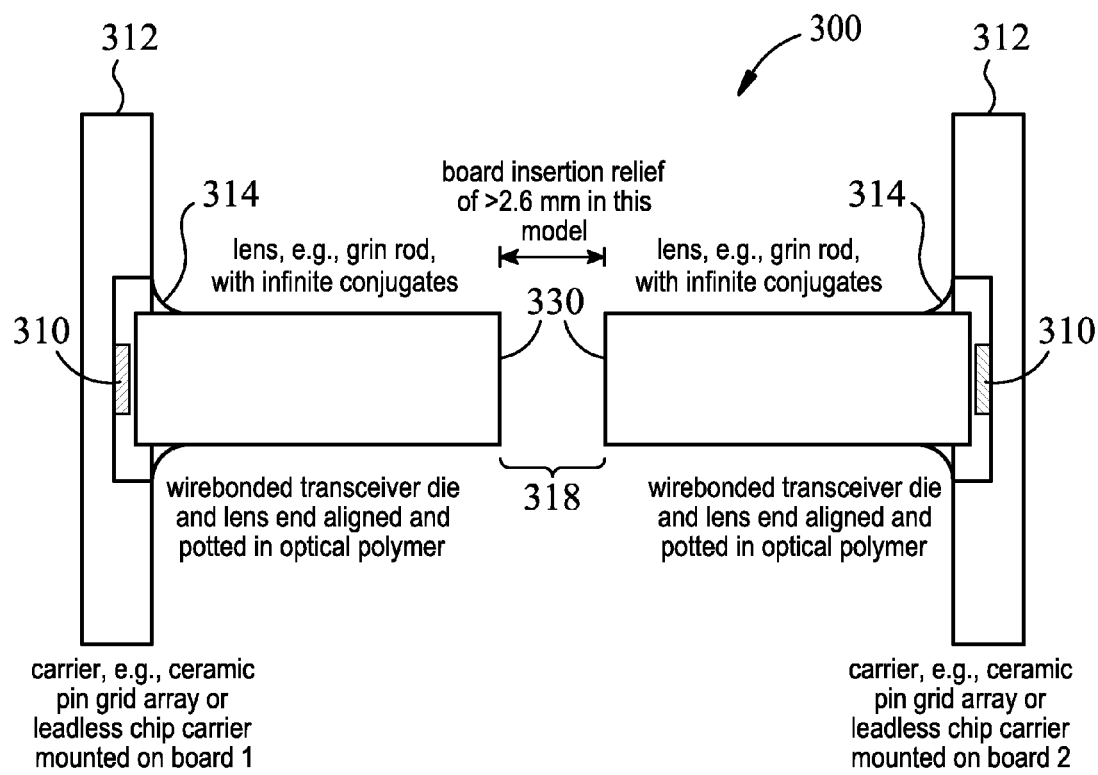
FIG. 14 is a schematic representation of yet another embodiment of the optical interconnect system of these teachings.

Another embodiment of the present teachings is the infinite-conjugate relaxed-tolerance optical data pipe optical interconnect system 300 shown in FIG. 14. This system includes a pair of transceiver modules each comprising a carrier 312, transceiver die 310, and infinite conjugate rod lens 330. The rod lens 330 is pre-aligned over the transceiver array 310 and cemented in place using an optical polymer 314 or similar cement, which also acts as a structural potting compound. The transceiver die may be wirebonded, solder bump bonded, or electrically contacted by similar means to the carrier. The carrier may be a ceramic pin grid array, ball grid array, or leadless chip carrier, or other means for electrically connecting the transceiver die. There is a gap 318 between the two modules. These mating modules can be mounted on separate boards for board-to-board interconnection, or alternatively they may be mounted on neighboring circuits, chips, MCMs (multi-chip modules), etc., in which case the carrier 312 may be eliminated or replaced with a carrier also holding the circuits to be interconnected (e.g., incorporated directly in a MCM).

Figure 15:
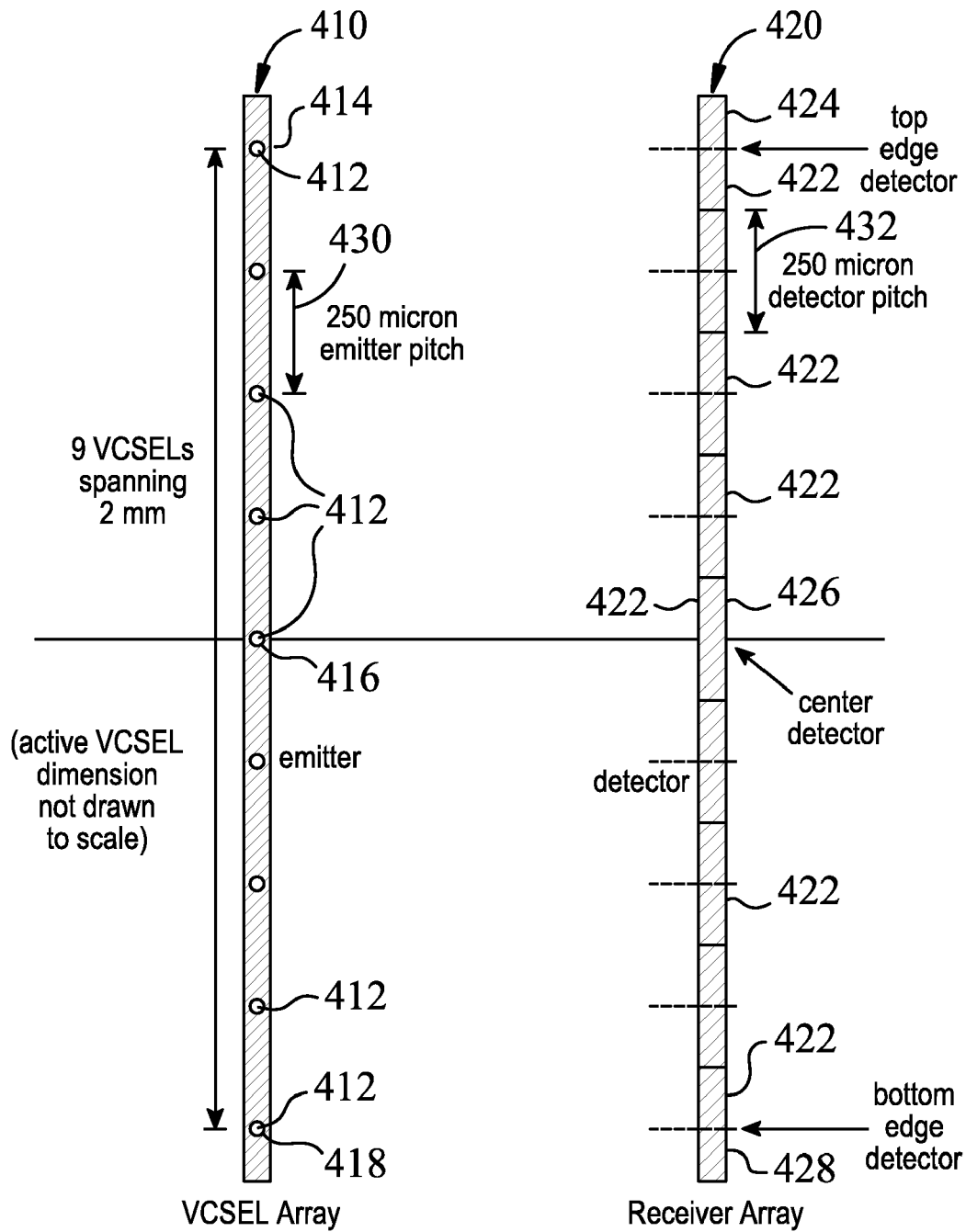
FIG. 15 is a schematic representation of an emitter array and a receiver array utilized in a detailed embodiment of the optical interconnect system of these teachings.

A breakthrough degree of angular tolerance between the optical data pipe transceiver modules of system 300 can be achieved by proper choice of detector element sizes with respect to the imaged spot size on the detectors in this optical interconnect system. A detailed example of the wide angular tolerance available in this infinite-conjugate relaxed-tolerance optical interconnect system 300 is described in FIGS. 14-18. The transceiver die 310 of FIG. 14 can comprise tiled arrays of emitters and detectors together with supporting circuitry for driving of the emitters and amplifying the output of the detectors (See FIG. 19). These transceiver die comprising both emitters and detectors allows for bi-directional interconnection. For simplicity in the following angular alignment tolerance discussion, however, FIG. 15 illustrates the uni-directional case of an emitter array 410 which is imaged onto a detector (receiver) array 420.

Other parameters chosen for this case study include: commercial off-the-shelf gradient index rod lenses with a diameter of 4 mm; rod lens lengths of 10.24 mm; VCSEL wavelength 830 nm; VCSEL emission cone angle +/− 15 degrees (air). A gap has been provided between die and lens surfaces to allow wire bond relief. The boards on which the transceiver modules of FIG. 14 are mounted are not shown in FIG. 16-FIG. 18.

Figure 16A:
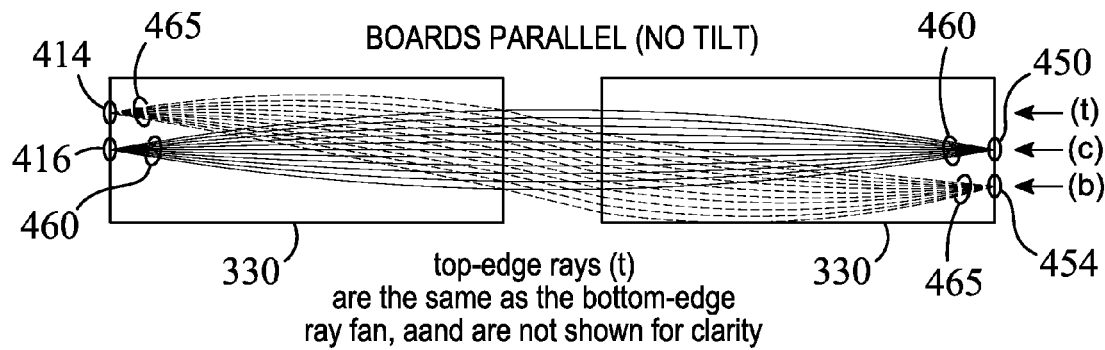
FIG. 16a is a schematic representation of an optical ray-trace for an embodiment of the optical interconnect system of these teachings including substantially aligned components.
Figure 16B:
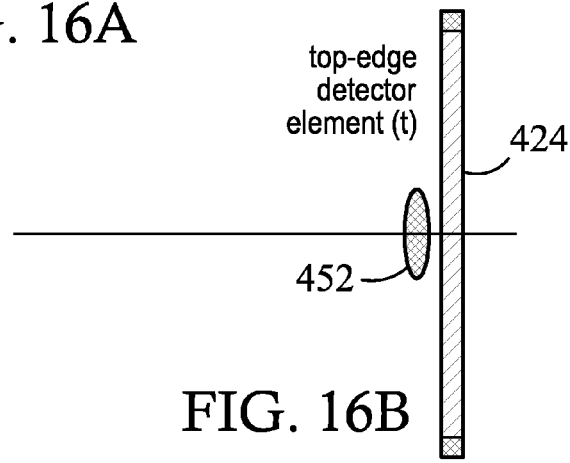
FIG. 16b-d are schematic representations of an image of one emitter from emitter array projected onto a detector from the receiver array.
Figure 16C:
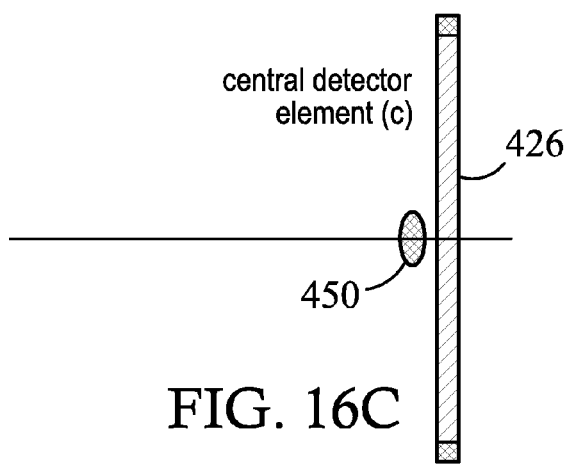
Figure 16D:
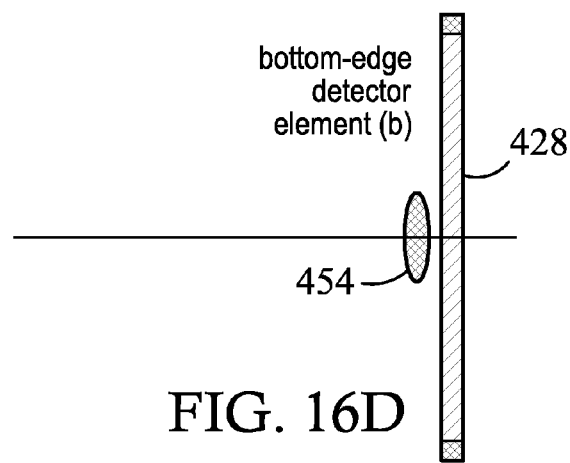
Figure 17:
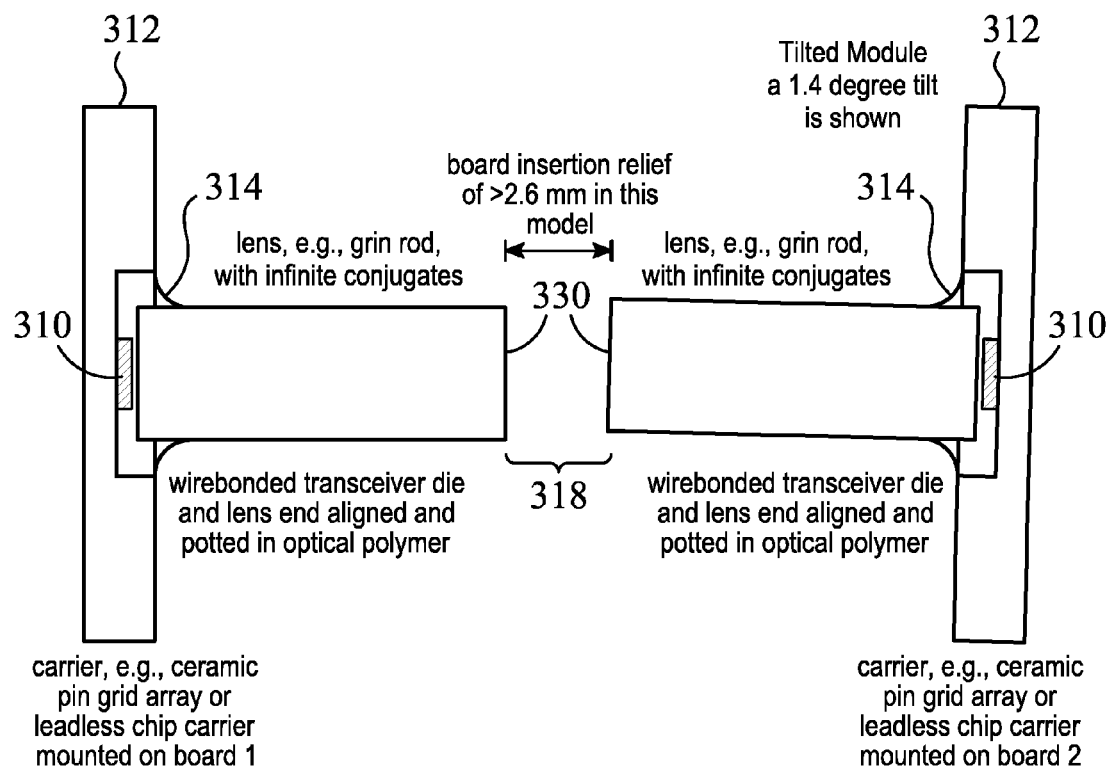
FIG. 17 is a schematic representation of an embodiment of the optical interconnect system of these teachings including slightly misaligned components.

The operation of this Broad Angle Tolerant Optical Data Pipe is illustrated in FIG. 16-FIG. 18. Additional parameters chosen for this numerical case study are shown in FIG. 15. The VCSEL array 410 comprise individual VCSELs 412 that are located on an array pitch 430 of 250-microns. The lateral extent of the array is 2 mm full width, sup-porting 9 VCSELs in that dimension. This can represent, for example, a cut through a circularly apertured hexagonally packed array of elements or alternatively a 9×9 array of VCSELs. As described earlier, the VCSELs and receivers may be tiled in the corresponding 2-D array for bi-directional interconnection. In FIG. 15 the emitters and detectors are shown to scale in 1 dimension, and are located in arrays with a 250-micron pitch. The active VCSEL apertures have been exaggerated in the figure.

The detectors are modeled with a 240-micron wide active area, and a 10 micron dead space separating the active areas. For reference later in the example, six special elements have been identified in FIG. 15: the top edge VCSEL 414 and top edge detector 424; the bottom edge VCSEL 418 and bottom edge detector 428; and the central VCSEL 416 and central detector 426. The size and location of imaged spots, defined through raytrace calculations, will be illustrated in FIGS. 16 and 18 for each of these three limiting cases.

The parameters of this case study were chosen as a typical example with which to demonstrate the very large angular alignment tolerances. Related scenarios with other parameters, e.g., with larger or smaller detector sizes, follow accordingly. For example, if very large single channel bandwidths are required, smaller detector active areas may be desirable and will be accompanied by reduced angular alignment tolerances. Experiments were performed, however, illustrating a wide angular alignment tolerance even with 100 micron detector apertures.

FIG. 16A illustrates real optical raytrace data for aligned (no tilt) rod lenses 330, and an air gap 318 of 2.6 mm between Optical Data Pipe module ends. On-axis VCSEL 416 emits a fan of rays 460 that are imaged onto spot 450. Similarly top edge VCSEL 414 emits a fan of rays 465 that are imaged on to spot 454. Due to symmetry, the spot 452 on the top-edge detector element 424 shown in FIG. 16(b) is identical to the bottom-edge spot 454 imaged onto detector element 428 as shown in FIG. 16(d). FIG. 16(c) shows the spot 450 on detector element 426. The locations of the spots and their sizes are shown to scale in FIG. 16. The corresponding detector size is also shown to scale. Here the sizes of the spots represent the dimension enclosing 95% of the optical energy in the imaged spot. Clearly the channels are linked with negligible crosstalk. Further, it is seen in this calculation that there are no vignetted rays even with an air gap of 2.6 mm. When the modules are separated with larger air gaps than these (for this case), the throughput of the edge optical channels will begin to slowly degrade.

Now the case where one of the modules is tilted with respect to the other is considered. This tilt represents an angular alignment error between the modules or the boards that they are mounted on. FIG. 17 illustrates the board-to-board ODP modules used to interconnect circuit boards that are tilted by 1.4 degrees. The air gap 318 between the modules is maintained at 2.6 mm, and the second module is tilted with respect to the first by 1.4 degrees as shown in FIG. 17. In this figure, the 1.4-degree tilt between the modules is clearly visible.

As a result of the tilt, the spots imaged by the interconnect translate across the detector plane. This translation of the imaged spots is shown to scale in FIG. 18, and is based on real raytrace data. The tilt angle of 1.4 degrees was chosen since it still allows for essentially all the light from the optical channels to fall on their respective detector elements (i.e., no vignetting). This tilt represents a total tilt budget. In practice, this 1.4-degree angular alignment budget can be distributed between tilt of the boards themselves, and other tilt sources including tilt of the carriers in their sockets, etc.

Figure 18A:
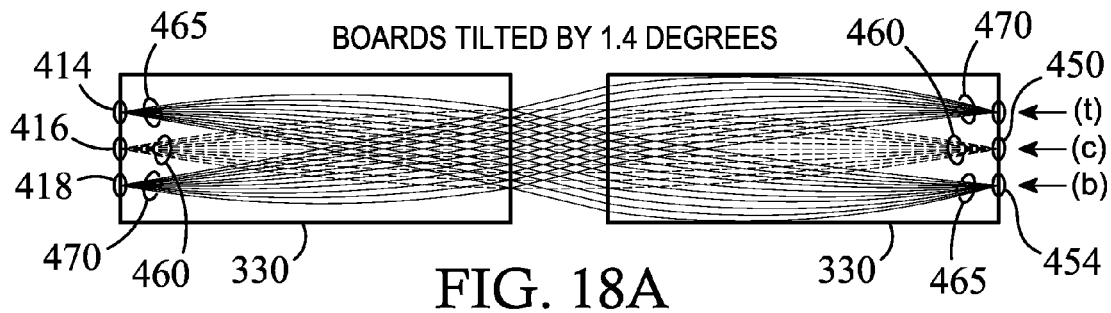
FIG. 18a is a schematic representation of an optical ray-trace for an embodiment of the optical interconnect system of these teachings including slightly misaligned components.
Figure 19:
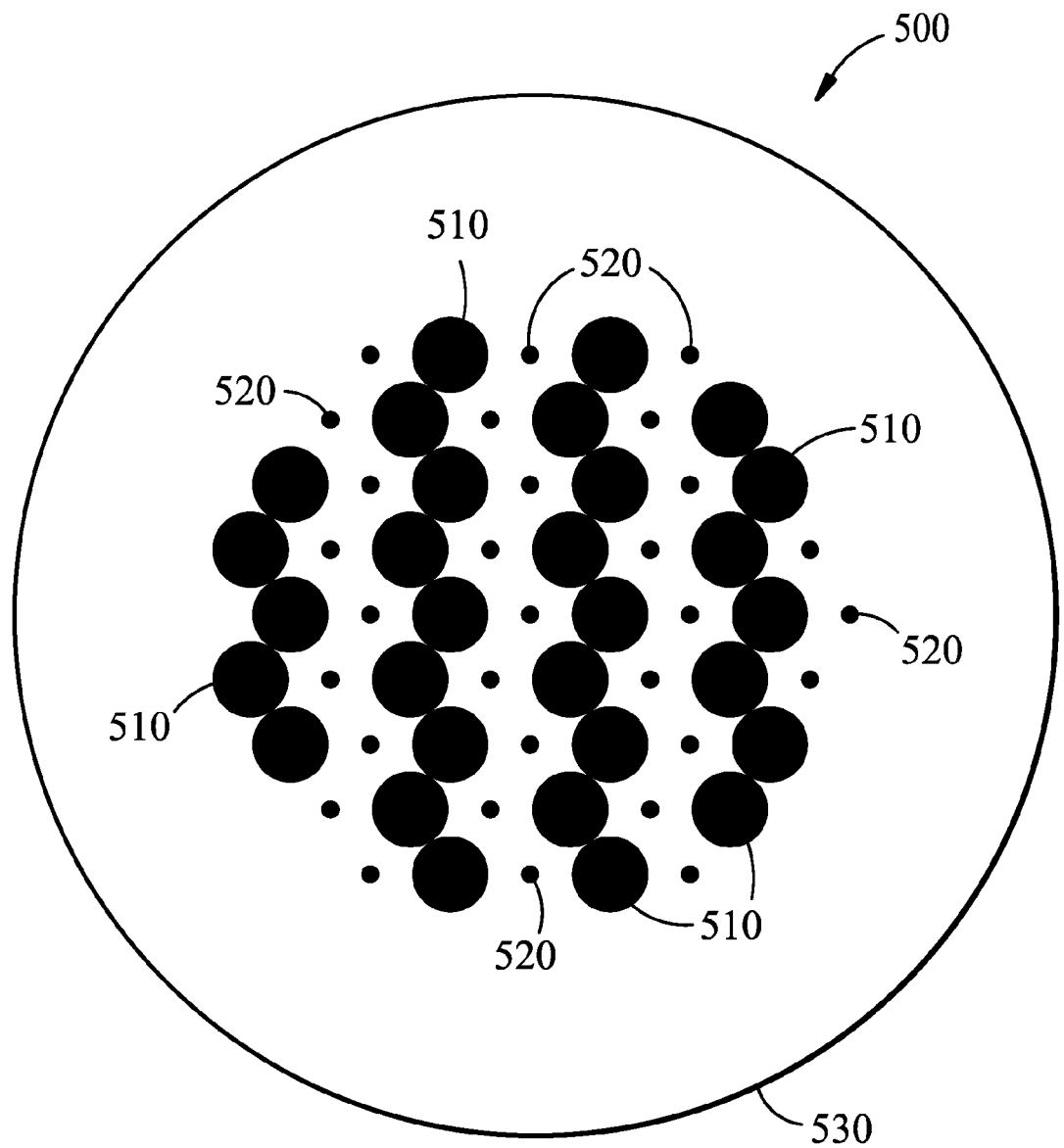
FIG. 19 is a schematic representation of hexagonally packed arrays of emitters and detectors (receivers)
Figure 20:
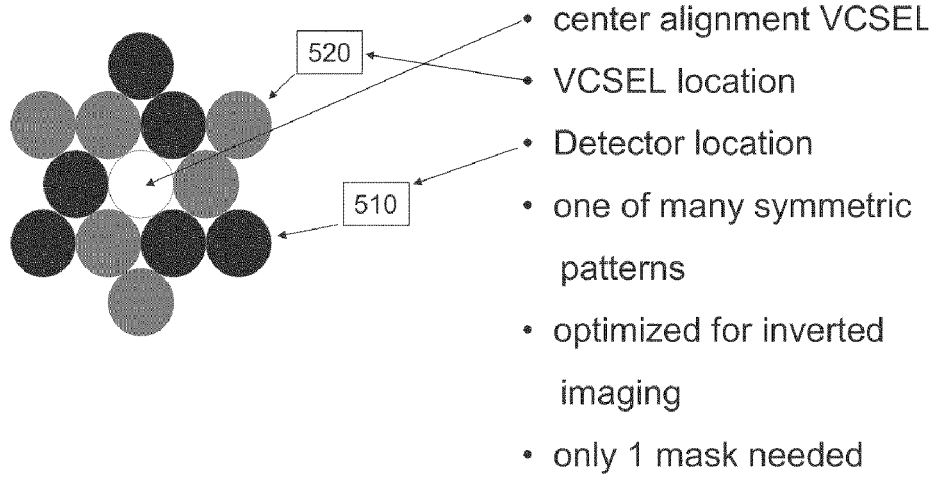
Figure 21:
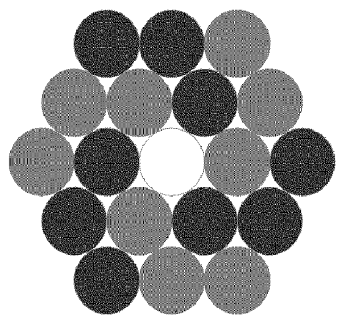
Figure 22:
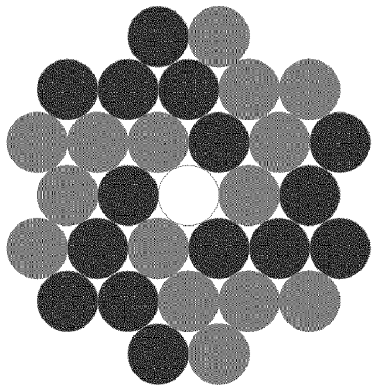
Figure 23:
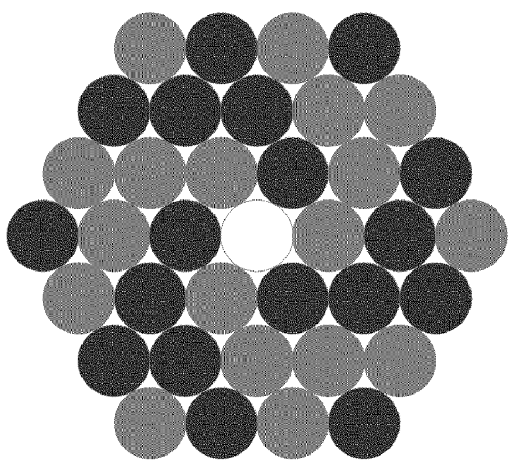
Figure 24:
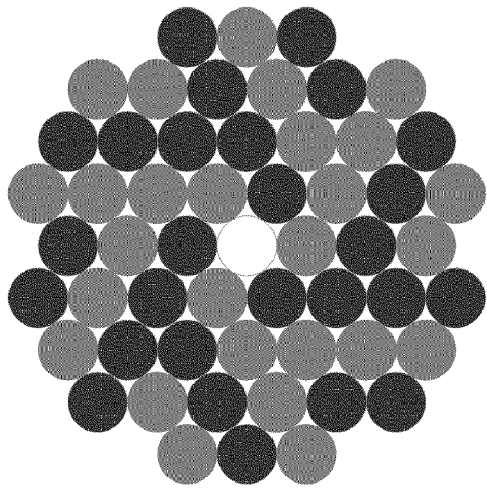
Figure 25:
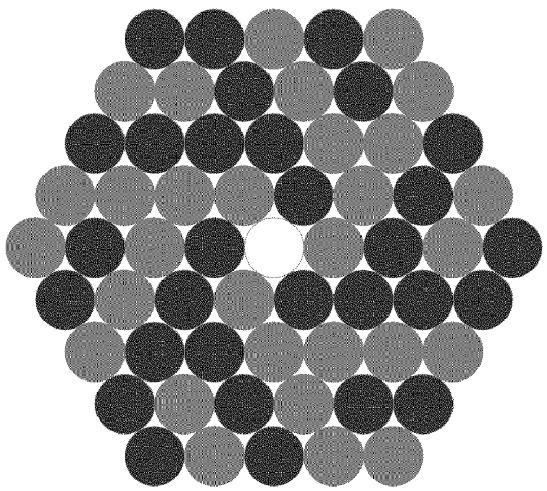
Figure 26:
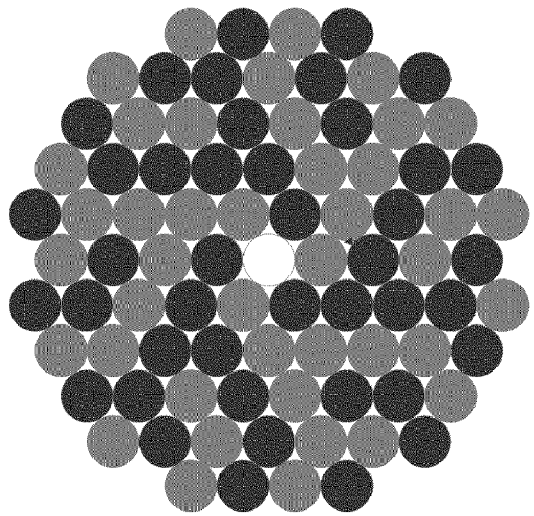

FIG. 18(a) illustrates real optical raytrace data for rod lenses 330 which are misaligned (tilted) by 1.4 degrees with respect to each other. Air gap 318 of 2.6 mm between Optical Data Pipe module ends is maintained. On-axis VCSEL 416 emits a fan of rays 460 that are imaged onto spot 450. Similarly top edge VCSEL 414 emits a fan of rays 465 that are imaged on to spot 454. Further, bottom-edge VCSEL 418 emits the fan of rays 470 which are imaged onto top-edge detector spot 452. The tilt has broken the symmetry and spots 452 and 454 are no longer identical.

Figure 18B:
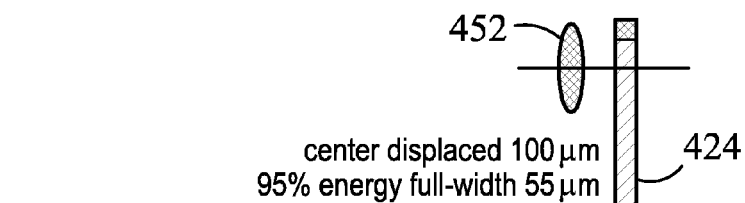
FIG. 18b-d are schematic representations of an image of one emitter from emitter array projected onto a detector from the receiver array for the embodiment of FIG. 17.
Figure 18C:
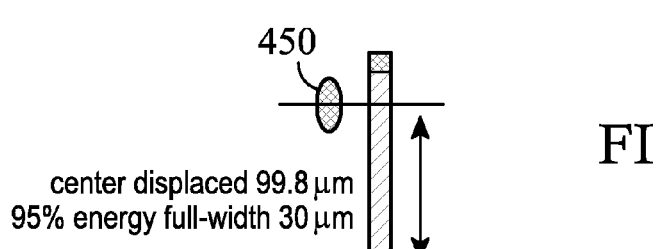
Figure 18D:
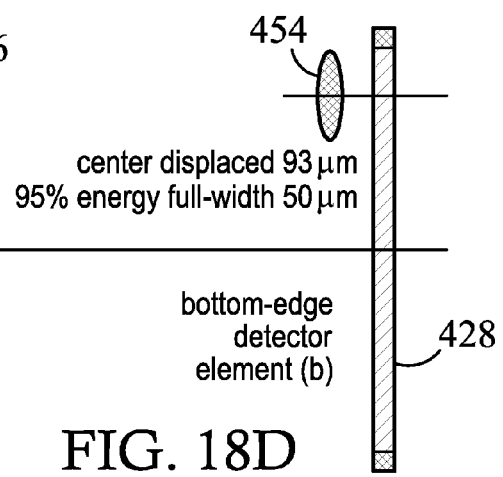

FIG. 18(b) shows that the top-edge detector spot 452 has been displaced 100 microns from the no-tilt case, and has a 95% energy full-width of 55 microns. It clearly lands on detector element 424 as required. Similarly, FIG. 18(c) shows that the center element spot 450 also clearly falls on its targeted detector element 426 and is displaced by 99.8 microns with a 95% energy full width of 30 microns. Finally, FIG. 18(d) shows the spot 454 also resides on the targeted bottom-edge detector element 428. Here the spot center is displaced by 93 microns, with a 95% full-width of 50 microns. The locations of the spots and their sizes are shown to scale in FIGS. 18(b)-18(d), where the sizes of the spots shown represents the dimension enclosing 95% of the optical energy in the images spot. The size of the corresponding detector is also shown to scale. As can be seen from FIGS. 16(b)-16(d) and 18(b)-!8(d) the detector size is larger than the spot size. As expected, the on-axis VCSEL is imaged to the smallest spot, while aberrations increase the spot sizes of the edge elements. Clearly the channels are still linked with negligible crosstalk. There is an edge of the edge spot that falls on the 10-micron guard band separating detector elements, but very little crosstalk into the neighboring detector is evident. The crosstalk should be very low since, of the 5% of the energy outside of the spot shown, only a tiny fraction will fall past the guard band into the neighboring detector element. Further, it is seen in this calculation that there are essentially no vignetted rays even with an air gap of 2.6 mm.

The calculation described above illustrates that a remarkable angular misalignment of +/− 1.4 degrees can be tolerated between the two Optical Data Pipe modules while still allowing for nearly lossless (non-vignetted) imaging in the optical interconnect.

As described above, both a longitudinal separation of several millimeters between paired ODP transceiver modules, and an angular tilt allowance of 1.4 degrees between such modules, can be simultaneously tolerated. These wide angular tolerances have a very important impact for practical optical interconnect applications. For example, consider a pair of computer boards, each measuring 10-20 inches in length, inserted in a computer with a separation that is 2-4 mm larger on one end of the board than the other. This magnitude of "board parallelism" tolerance is not difficult to maintain with simple conventional connectors and manufacturing practices.

For this case, the angular tilt between the neighboring board planes is on the order of 0.5 degrees, or just more than ⅓ of the tilt tolerance of 1.4 degrees. Further, typical carriers, such as pin grid arrays or leadless chip carriers, can also be inserted repeatedly with small angular tolerances. Further it is straightforward to cement or "pot" the rod lens in an alignment jig during manufacture that assures angular misalignments of a fraction of a degree. Taken together with the lateral and gap tolerances of millimeters, these results indicate that the Optical Data Pipe modules can simply be mounted on neighboring boards and will allow 60 to hundreds of channels to be reliably optically interconnected without the need to introduce special high precision alignment aids-current off-the-shelf tolerances for backplanes and computers are typically sufficient.

Similarly, the approach is practical in terms of board-to-board separation. In addition to the several millimeters or more tolerance on separation, the interconnected boards can be spaced by relatively large distances, since rod lenses can be used with integral multiples of additional half-pitch lengths incorporated with little deleterious effect.

Further optimization in performance can be obtained with hexagonally packed arrays of emitters and detectors (receivers), as mentioned earlier. One of many such hexagonally packed device layouts is shown in die layout 500 of FIG. 19. Here the centers of VCSELs 520 and detectors 510 are located on a regular hexagonal grid. The detector apertures are shown to scale assuming a 300-micron diameter and are shown inside a 4 mm circle representing the edge of a typical off-the-shelf rod lens. The tiling shown including both emitters and detectors allows for bi-directional interconnection. Variations that are not centered in a device allow for a single mask set for both sides of the interconnect. Alternatively the unidirectional form contains a hexagonal grid of emitters facing a matching hexagonal grid of detectors (receivers). The hexagonal packing of the devices gives the advantages of simple conformity to the circular fields of typical lenses, and improved crosstalk performance. Since the distance to the nearest neighbor is more uniform than in Cartesian grids, a higher density can often be obtained with a given level of acceptable crosstalk.

FIGS. 20-37 show positions for emitters and detectors in a bi-directional optoelectronic die layout. These device patterns have varying degrees of symmetry so that in some cases substantially the same mask sets can be used for die on both ends of the optical data pipe. As described below, in some cases even identical die can be used on both ends of the optical data pipe. Other patterns need to have a special die pair constructed.

The common principle is that the die on either end of the optical data pipe are configured such that emitters and detectors on each end are imaged onto each other, respectively. This imaging step can be inverting, as in the case of an odd number of imaging or relay steps; or the imaging can be non-inverting if there are an even number of imaging or relay steps. Similarly, the die containing the emitters and detectors can face each other, as when the devices reside on the top of each die and the top surfaces of each die are imaged onto each other in the optical data pipe. Wirebonding is typically used to connect to the die in this case. Alternatively, the die can use "bottom emitting" devices and detectors located on the bottom die surface, as with flip-chip packaging. A special situation arises when these two cases are mixed and a top surface device array is imaged onto a bottom surface device array. But, in typical embodiments, there is only a single imaging inversion and the die face each other, i.e., both top surface located devices or both bottom surface located devices.

Figure 27:
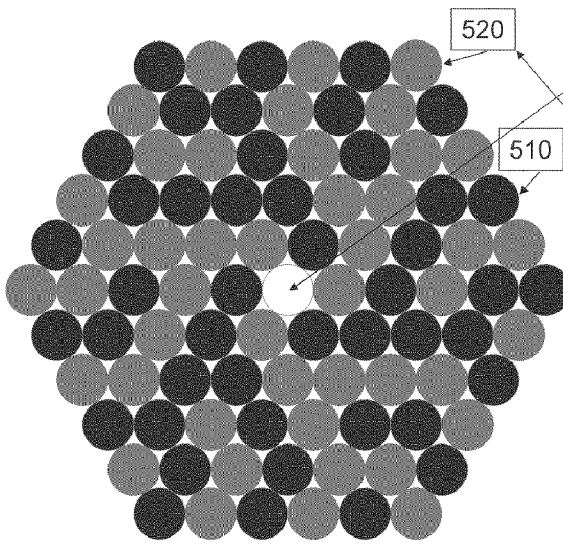
Figure 34:
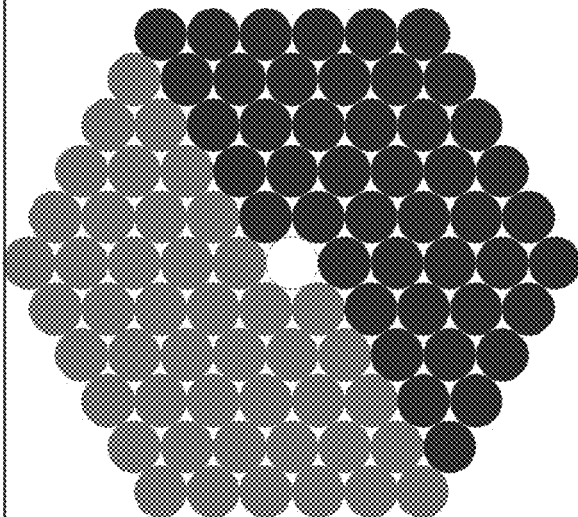

FIGS. 20-37 show a variety of bi-directional die layout embodiments with both emitters and detectors. In the embodiments presented, the emitters 520 are shown as light shaded circles and the detectors 510 are shown as dark circles. These circles are meant to show the spatial locations of the devices, and not necessarily their relative sizes. For example, the emitters and the detectors in the embodiment of FIG. 27 are shown to be the same size, while in the device array embodiment shown in FIG. 28 the emitters are shown to be smaller than the detectors. When VCSELs are used as emitters, their size is typically very small compared to the detectors. In these teachings, the detector sizes are made large, often as large as possible, so as to provide maximum alignment tolerance. The detector size is sometimes limited so that the speed of the detector is not too slow. One feature of the embodiments of these teachings is that an optional center VCSEL or emitter of some form can be used to align the arrays.

The interleaved patterns of detectors and relatively smaller emitters have advantages which allow for routing of traces in between spaces between emitters and detectors when access to center elements is required. An additional benefit of the interleaved emitter and detector device patterns is that the thermal load, often weighted toward the emitters, is more uniform across the die. This sometimes allows for more efficient thermal management.

Figure 35:
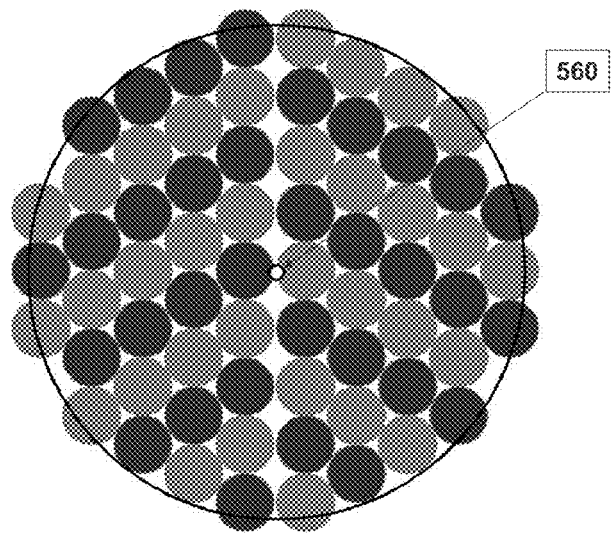
Figure 36:
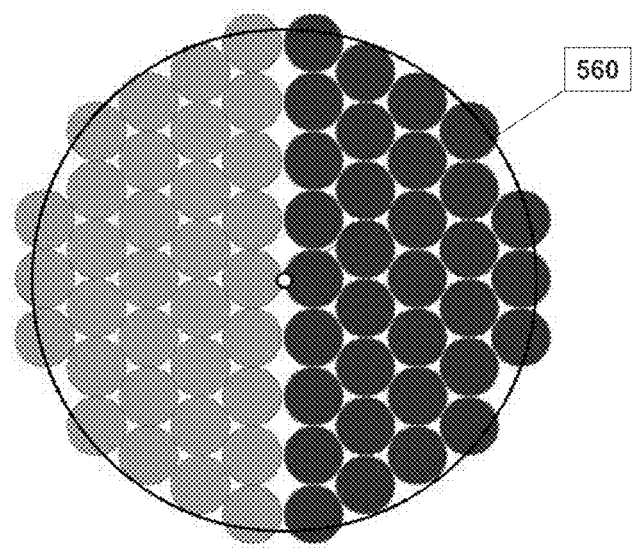
Figure 37:
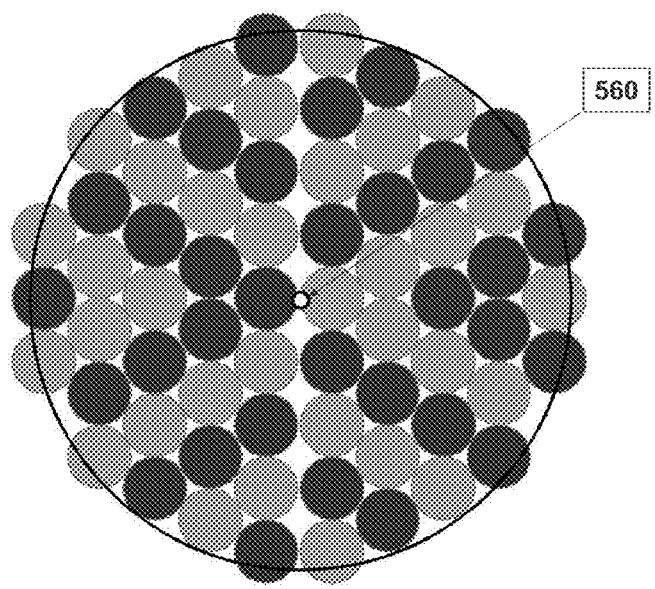

The device array embodiments shown in FIGS. 35-37 contain arrangements of emitters and detectors in a given half of the array that are symmetric to a second half of the array about a line passing through the center of the device array as shown. There is also an optional center alignment emitter 560 shown at the center of the device array. Device arrays with the symmetries of embodiments shown in FIGS. 35-37 result in die that can be used on both ends of the optical data pipe (e.g., with top-surface of die devices on each end) without the need for making multiple mask sets or differing dies for either end.

Figure 38:
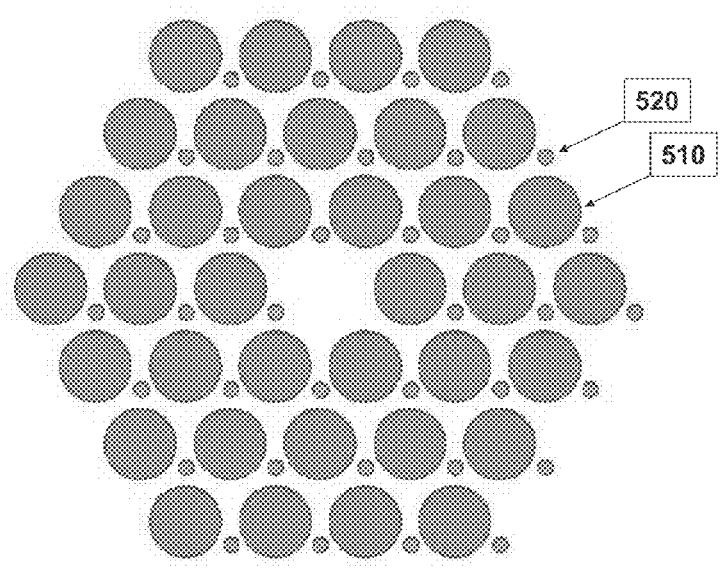
FIG. 38 shows an embodiment with hybrid hexagonal array of emitters and detectors.
Figure 39:
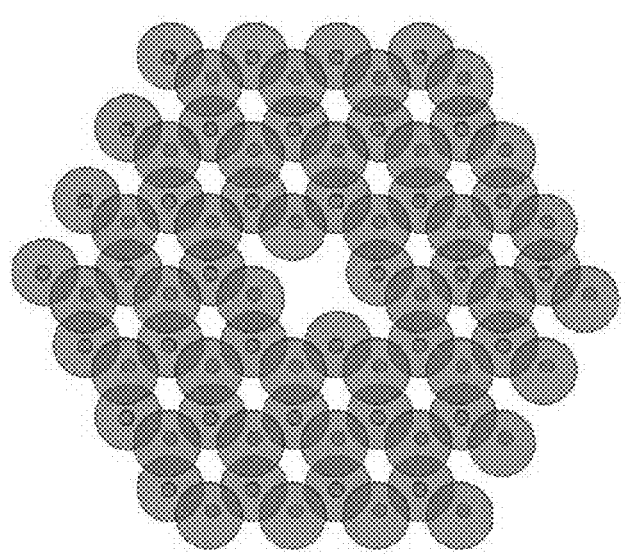
FIG. 39 shows the same array as in FIG. 38 when a second array is imaged onto it.

FIG. 38 shows an embodiment with hybrid hexagonal array of emitters 520 (small circles) and hexagonal array of detectors 510 (big circles). In this embodiment of the present invention, the arrays of emitters and the arrays of detectors are offset relative to each other. This pattern keeps the distance from emitters and detectors substantially maximally and uniformly separated so crosstalk will be substantially small and uniform. The embodiments of FIG. 38 are also substantially symmetric about a line of symmetry so that a single die layout can be used on both ends of an optical data pipe as discussed above and emitters will line up with detectors and vice versa. FIG. 38 shows a single array, and FIG. 39 shows the same array when a second array is imaged onto it. Thus, each emitter is imaged onto a detector and each detector has an emitter imaged onto it. It can be deduced from FIG. 39 that there is a substantially maximized uniform distance from each emitter to each neighboring detector so crosstalk will be small and uniform. In the embodiment shown in FIG. 38, a hexagonal array of emitters is offset from a hexagonal array of detectors and the center of the array of emitters is displaced from the center of the array of detectors. In one instance, the center of the combined array is located substantially at the bisecting point of the line connecting the center of the array of emitters and the center of the array of detectors.

Figure 40:
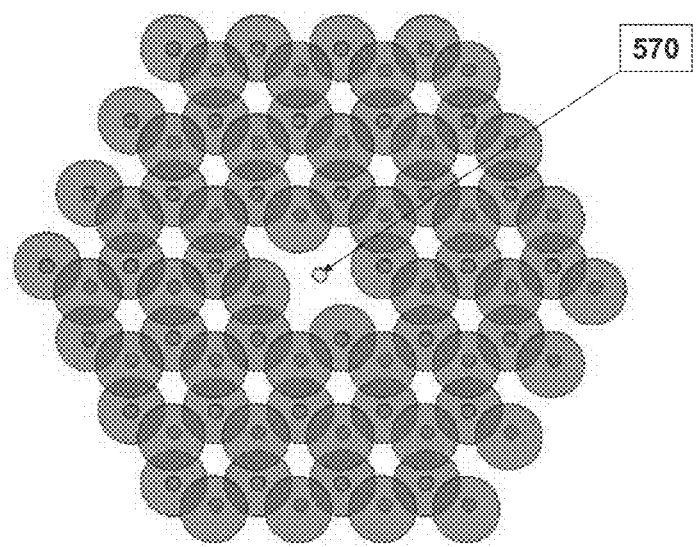
FIG. 40 shows the same array as in FIG. 39 with the additional feature of an emitter (such as a VCSEL) shown as a small circle located at the center of symmetry of the hybrid hexagonal array.

FIG. 40 shows the additional feature of an emitter 570 (such as a VCSEL) shown as a small circle located at this center of symmetry of the hybrid hexagonal array. This facilitates the alignment of the die so that emitters on one die fall on detectors on another die when imaged. Additional alignment emitters can be added to facilitate or automate alignment, e.g.

such as a second emitter at the edge of the die to angular orientation can be facilitated or automated.

Figures 41A, 41B:
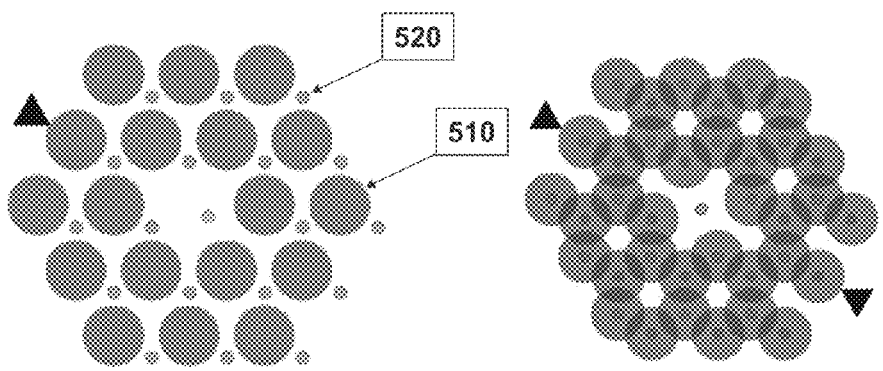
FIGS. 41a-41b show an array of emitters and an array of detectors, each on identical pitch configurations, that are offset by one half pitch of a unit cell with hexagonally placed device locations.
Figure 42A:
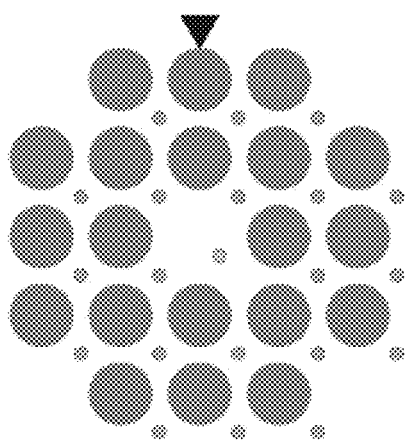
FIGS. 42a-42b show an array of emitters and an array of detectors, each on identical pitch configurations, that are offset by one half pitch of a unit cell with device locations centered on a Cartesian grid.
Figure 42B:
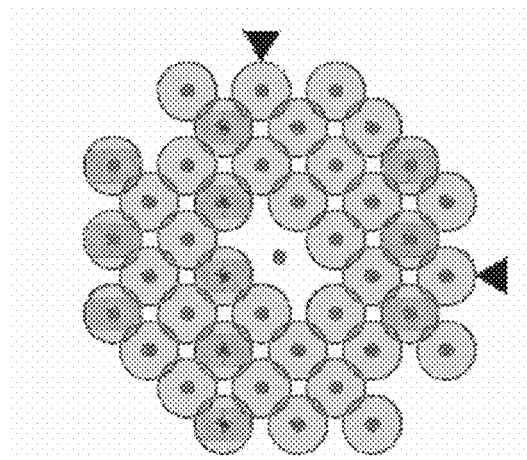

The bi-directional optoelectronic die layout embodiments shown in FIGS. 41a-41b and 42a-42b, comprise an array of emitters 520 and an array of detectors 510, each on identical pitch configurations whose centers are symmetrically offset from the center of the overall device array. FIGS. 41a-41b use hexagonally placed device locations, while FIGS. 42a-42b use device locations centered on a Cartesian grid. The reference center of the combined bi-directional optoelectronic die would be defined as the midpoint of the line that connects the centers of the emitter and detector arrays, and by aligning the centers of two die with one another and applying a rotation about this center of one die relative to another (one example rotation is indicated by the triangular markers in FIGS. 41a-41b, 42a-42b), each emitter on one die can be imaged to the detector on another such that all emitters and detectors are paired. Since the emitters are typically smaller than the detectors, they can be located between the detectors such that the crosstalk of the detectors is minimized for a given number of channels per unit area on the die. This advantage can be very significant over the case of die that are composed of separate sections of emitters and detectors.

Although the teachings have been described with respect to various embodiments, it should be realized these teachings is also capable of a wide variety of further and other embodiments within the spirit and scope of the appended claims.

What is claimed is:

1. An optical interconnect system, comprising:
   a first optical sub-system; and
   a second optical sub-system;
   said first optical sub-system comprising a first end and a second end, and further having a preselected length, and a preselected width;
   said second optical sub-system comprising a first end and a second end, and further having a preselected length, and a preselected width;
   first means fixedly secured to said first end of said first optical sub-system, said first means comprising first means for emitting electromagnetic radiation, said first emitting means comprising a first array of emitters, and first means for receiving emitted electromagnetic radiation, said first receiving means comprising a first array of detectors, each detector from said first array of detectors having substantially a preselected size;
   second means fixedly secured to said second end of said second optical sub-system, said second means comprising second means for receiving emitted electromagnetic radiation, said second receiving means comprising a second array of detectors, each detector from said second array of detectors having substantially a preselected size, and second means for emitting electromagnetic radiation, said second emitting means comprising a second array of emitters;
   said first optical sub-system imaging electromagnetic radiation from said first emitting means into an array of substantially collimated beams of electromagnetic radiation; at least two beams from said array of substantially collimated beams of electromagnetic radiation propagating at different propagation angles,
   said second optical sub-system having its first end spaced apart and proximate said second end of said first optical sub-system;
   said first end of said second optical sub-system and said second end of said first optical sub-system defining a space therebetween; and
   said second optical sub-system, receives electromagnetic radiation from said first optical sub-system and forms an image of said first emitting means onto said second receiving means;
   said second optical sub-system imaging electromagnetic radiation from said second emitting means into another array of substantially collimated beams of electromagnetic radiation; at least two beams from said another array of substantially collimated beams of electromagnetic radiation propagating at different propagation angles;
   said first optical sub-system, receives electromagnetic radiation from said second optical sub-system and forms an image of said second emitting means onto said first receiving means.

2. The optical interconnect system of claim 1 wherein said first array of emitters and said first array of detectors comprise a first interleaved array of detectors and emitters.

3. The optical interconnect system of claim 2 wherein said first interleaved array of detectors and emitters is a hexagonal array of detectors and emitters.

4. The optical interconnect system of claim 1 wherein said second array of emitters and said second array of detectors comprise a second interleaved array of detectors and emitters.

5. The optical interconnect system of claim 4 wherein said second interleaved array of detectors and emitters is a hexagonal array of detectors and emitters.

* * * * *